(12) United States Patent
Matsui et al.

(10) Patent No.: US 9,374,159 B2
(45) Date of Patent: Jun. 21, 2016

(54) RECEPTION DISPLAY APPARATUS, INFORMATION TRANSMISSION APPARATUS, OPTICAL WIRELESS COMMUNICATION SYSTEM, RECEPTION DISPLAY INTEGRATED CIRCUIT, INFORMATION TRANSMISSION INTEGRATED CIRCUIT, RECEPTION DISPLAY PROGRAM, INFORMATION TRANSMISSION PROGRAM, AND OPTICAL WIRELESS COMMUNICATION METHOD

(75) Inventors: Norihiro Matsui, Osaka (JP); Kazunori Yamada, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 964 days.

(21) Appl. No.: 13/391,680

(22) PCT Filed: Aug. 4, 2011

(86) PCT No.: PCT/JP2011/004444
§ 371 (c)(1),
(2), (4) Date: Feb. 22, 2012

(87) PCT Pub. No.: WO2012/023253
PCT Pub. Date: Feb. 23, 2012

(65) Prior Publication Data
US 2012/0154443 A1    Jun. 21, 2012

(30) Foreign Application Priority Data

Aug. 20, 2010   (JP) ................................ 2010-185008

(51) Int. Cl.
*G09G 5/00* (2006.01)
*H04B 10/112* (2013.01)
(Continued)

(52) U.S. Cl.
CPC ............ *H04B 10/1121* (2013.01); *G09G 5/395* (2013.01); *G09G 5/14* (2013.01); *G09G 2340/125* (2013.01); *H04N 5/23206* (2013.01)

(58) Field of Classification Search
CPC ... G09G 5/395; G09G 5/14; G09G 2340/125; H04B 10/1121
See application file for complete search history.

(56) References Cited

U.S. PATENT DOCUMENTS 5,673,252 A * 9/1997 Johnson et al. ................ 370/449
6,084,694 A * 7/2000 Milton et al. .................... 398/83
(Continued)

FOREIGN PATENT DOCUMENTS

| CN | 101536596 | 9/2009 |
|---|---|---|
| JP | 3-40616 | 2/1991 |

(Continued)

OTHER PUBLICATIONS

International Search Report issued Sep. 6, 2011 in corresponding International Application No. PCT/JP2011/004444.

*Primary Examiner* — James A Thompson
*Assistant Examiner* — Tapas Mazumder
(74) *Attorney, Agent, or Firm* — Wenderoth, Lind & Ponack, L.L.P.

(57) ABSTRACT

A reception display apparatus and the like which display display information regarding an information transmission apparatus blocked by an obstacle, on an image representing a taken video image, such that the display information corresponds to the position of the information transmission apparatus, are provided. A reception section time-sequentially takes an image and receives, from an apparatus, direct-transmission information including information regarding the apparatus, and forwarding information which includes information regarding an apparatus and relative position information indicating a relative position of the apparatus with respect to the apparatus. A measurement section measures a relative position of the apparatus with respect to the own apparatus. An information processing section superimposes the information regarding the apparatus included in the direct-transmission information, and calculates a coordinate position of the apparatus on the taken image, to display the information regarding the apparatus included in the forwarding information.

15 Claims, 9 Drawing Sheets

(51) Int. Cl.
 *G09G 5/395* (2006.01)
 *G09G 5/14* (2006.01)
 *H04N 5/232* (2006.01)

(56) References Cited

U.S. PATENT DOCUMENTS

| | | | |
|---|---|---|---|
| 2008/0010385 A1* | 1/2008 | Lee et al. | 709/241 |
| 2008/0030711 A1* | 2/2008 | Iizuka | 356/4.03 |
| 2010/0056180 A1 | 3/2010 | Gessner et al. | |
| 2011/0085494 A1* | 4/2011 | Ji | H04W 40/12 370/328 |
| 2011/0254861 A1* | 10/2011 | Emura et al. | 345/633 |
| 2012/0120107 A1* | 5/2012 | Nakanishi et al. | 345/634 |

FOREIGN PATENT DOCUMENTS

| | | |
|---|---|---|
| JP | 2003-323239 | 11/2003 |
| JP | 2005-80116 | 3/2005 |
| JP | 2007-228512 | 9/2007 |

\* cited by examiner

RECEPTION DISPLAY APPARATUS, INFORMATION TRANSMISSION APPARATUS, OPTICAL WIRELESS COMMUNICATION SYSTEM, RECEPTION DISPLAY INTEGRATED CIRCUIT, INFORMATION TRANSMISSION INTEGRATED CIRCUIT, RECEPTION DISPLAY PROGRAM, INFORMATION TRANSMISSION PROGRAM, AND OPTICAL WIRELESS COMMUNICATION METHOD

TECHNICAL FIELD

The present invention relates to an optical wireless communication apparatus which transmits and receive data by using light such as visible light, infrared light, and a laser, and more particularly, relates to a technology for displaying data obtained from a light source apparatus, on an image representing a video image taken by a camera, such that the data corresponds to the light source apparatus.

BACKGROUND ART

In recent years, as mobile terminals such as a mobile phone, models equipped with high-accuracy cameras have been popularized, and applications and services which use the cameras have been increased. For example, a new form of navigation system which displays, on a screen displaying in real time a video image taken by a camera, the name of and detailed information regarding a building seen in the screen, detailed information and campaign information regarding an advertisement on a billboard seen in the screen, and the like, in such a manner that these items of information are superimposed on the images of the respective objects, has been attracting attention. A technology to realize such a new form of navigation system is called augmented reality (AR).

Meanwhile, in light of improvement of safety and speedup, a communication technology using optical wireless communication has been attracting attention.

In the communication technology using optical wireless communication, information can be transmitted directly from an installation position, and a relative position of the transmission source can relatively easily be identified. Thus, the communication technology is useful for realizing the above new form of navigation system.

Here, a new form of navigation system using optical wireless communication is disclosed in Patent Literature 1. In Patent Literature 1, an information processing apparatus such as a mobile phone performs position measurement by means of a GPS and transmits position information and search conditions to a server. The server instructs a light-emitting device that corresponds to the received position information and search conditions, to emit light on which data is superimposed. The information processing apparatus detects the light-emitting device that emits the light in a predetermined blinking pattern, from an image of an object to decode and obtain the data, and displays the obtained data on the image of the object such that the data corresponds to the position of the light-emitting device.

Further, the optical wireless communication has a problem that communication cannot be performed at all when a small obstacle is merely present on a straight line connecting the transmission side to the reception side.

In Patent Literature 1, when the light-emitting device that corresponds to the position information and the search conditions is blocked and the information processing apparatus cannot obtain data therefrom, the data is transmitted to unblocked another light-emitting device via the server, and the information processing apparatus obtains the data of the blocked light-emitting device from the other light-emitting device. In this manner, the above problem is solved.

CITATION LIST

Patent Literature

[PTL 1] Japanese Laid-Open Patent Publication No. 2007-22851

SUMMARY OF THE INVENTION

Problems to be Solved by the Invention

However, in the above Patent Literature 1, when a reception display apparatus cannot directly visually recognize an information transmission apparatus due to an obstacle on a straight line connecting the information transmission apparatus to the reception display apparatus, display information regarding the information transmission apparatus cannot be displayed on an image representing a video image taken by a camera, so as to correspond to the installed position of the information transmission apparatus.

For example, when information transmitted from an information transmission apparatus installed at a cafe B on the fifth floor of a building A is "lunch service is available at cafe B" and a reception display apparatus cannot directly receive the information due to an obstacle between the reception display apparatus and the information transmission apparatus or the like, the reception display apparatus can receive and display the contents of the information but cannot identify the position of the information transmission apparatus and the transmission direction of the information transmission apparatus in the above Patent Literature 1. Thus, the user of the reception display apparatus cannot intuitively recognize where the information is transmitted from.

It should be noted that in the above Patent Literature 1, optical wireless communication is used, and other public communication means such as a public network has to be used for communication between the information processing apparatus and the server and between the server and the light-emitting device. Thus, the following problems also arise that: an additional communication fee is incurred; and the technology cannot be used in an environment where it is outside the range in which the public communication means is available.

Further, the above Patent Literature 1 discloses a configuration in which in accordance with the position information and search conditions of each information processing apparatus, a corresponding light-emitting device emits light on which data is superimposed. However, in a situation where many information processing apparatuses are used simultaneously, when each light-emitting device is controlled so as to transmit, to each of the many information processing apparatuses, information which is appropriate to each information processing apparatus, the traffic becomes congested and the processing becomes complicated. Thus, in consideration of the band of the optical wireless communication, a lot of time is taken for communication, and hence the configuration is not realistic at all.

Moreover, the above Patent Literature 1 discloses a configuration in which when a light-emitting device is blocked, data is transmitted to another light-emitting device, which is unblocked, via a server and the other light-emitting device emits light on which the data of the blocked light-emitting device is superimposed. However, similarly to the above, such a configuration causes congestion of the traffic, and a lot of time is taken for communication. Thus, the configuration is not realistic.

The present invention is intended to solve the above problem that "when a reception display apparatus cannot directly visually recognize an information transmission apparatus due to an obstacle on a straight line connecting the information transmission apparatus to the reception display apparatus, display information regarding the information transmission apparatus cannot be displayed on an image representing a video image taken by a camera, so as to correspond to the installed position of the information transmission apparatus", and it is an object of the present invention to provide a reception display apparatus, an information transmission apparatus, an optical wireless communication system, a reception display integrated circuit, an information transmission integrated circuit, a reception display program, an information transmission program, and an optical wireless communication method, which can display, on an image representing a video image taken by a camera, display information regarding an information transmission apparatus blocked by an obstacle such as a building, such that the information corresponds to the position of the information transmission apparatus.

Solution to the Problems

The present invention is directed to a reception display apparatus, an information transmission apparatus, an optical wireless communication system, a reception display integrated circuit, an information transmission integrated circuit, a reception display program, an information transmission program, and an optical wireless communication method.

In order to solve the above described problem, the reception display apparatus of the present invention is an apparatus for receiving display information in the form of a signal profile of emitted light and superimposing the received display information on an image taken time-sequentially, to display the received display information on a display device, and includes a reception section, a measurement section, and an information processing section. The reception section time-sequentially takes an image, and receives, from a first information transmission apparatus, direct-transmission information which is transmitted in the form of a signal profile of emitted light and includes display information regarding the first information transmission apparatus, and forwarding information which is transmitted in the form of a signal profile of emitted light and includes display information regarding a second information transmission apparatus different from the first information transmission apparatus and one or a plurality of items of relative position information indicating a relative position of the second information transmission apparatus with respect to the first information transmission apparatus. The measurement section measures a relative position of the first information transmission apparatus with respect to the reception display apparatus. The information processing section superimposes the display information regarding the first information transmission apparatus included in the direct-transmission information received by the reception section, such that the display information is associated with a light-emitting position, corresponding to a position of the first information transmission apparatus, on the image taken by the reception section, and calculates a coordinate position of the second information transmission apparatus on the image taken by the reception section, on the basis of the light-emitting position, the one or the plurality of items of relative position information included in the forwarding information received by the reception section, and the relative position of the first information transmission apparatus measured by the measurement section and superimposes the display information regarding the second information transmission apparatus included in the forwarding information, such that the display information is associated with the coordinate position, to display these display information on the display device.

Further, in the reception display apparatus, preferably, the one or the plurality of items of relative position information included in the forwarding information received by the reception section is represented by a vector, the relative position of the first information transmission apparatus measured by the measurement section is represented by a vector, and the information processing section adds the vector representing the one or the plurality of items of relative position information included in the forwarding information received by the reception section and the vector representing the relative position of the first information transmission apparatus measured by the measurement section, to calculate, as one vector, a relative position of the second information transmission apparatus with respect to the reception display apparatus.

Further, in the reception display apparatus, preferably, the measurement section measures a relative distance and an angle of the first information transmission apparatus with respect to the reception display apparatus.

Further, in order to solve the above described problem, the information transmission apparatus of the present invention is an apparatus for transmitting, in the form of a signal profile of emitted light, display information which is to be displayed so as to be superimposed on an image taken time-sequentially in a reception apparatus, and includes a storage section, a reception section, a measurement section, an information processing section, and a transmission section. The storage section previously stores at least display information regarding the information transmission apparatus. The reception section receives, from a first information transmission apparatus different from the information transmission apparatus, direct-transmission information which is transmitted in the form of a signal profile of emitted light and includes display information regarding the first information transmission apparatus. The measurement section measures a relative position of the first information transmission apparatus with respect to a transmission position in the information transmission apparatus. The information processing section generates direct-transmission information including the display information regarding the information transmission apparatus previously stored in the storage section, and generates forwarding information which includes relative position information indicating the relative position of the first information transmission apparatus measured by the measurement section and the display information regarding the first information transmission apparatus included in the direct-transmission information received by the reception section. The transmission section which transmits the direct-transmission information and the forwarding information which are generated by the information processing section, in the form of a signal profile of emitted light.

Further, in the information transmission apparatus, preferably, the reception section further receives, from the first information transmission apparatus, forwarding information which is transmitted in the form of a signal profile of emitted light and includes display information regarding a second information transmission apparatus different from the first information transmission apparatus and relative position information indicating a relative position of the second information transmission apparatus with respect to the first information transmission apparatus, the information processing section further generates relative position information indicating a relative position of the second information transmission apparatus with respect to the information transmission apparatus, on the basis of the relative position information indicating the relative position measured by the measurement section and the relative position information regarding the second information transmission apparatus included in the forwarding information received by the reception section, and generates hierarchical forwarding information which includes the relative position information generated here and the display information regarding the second information transmission apparatus included in the forwarding information received by the reception section, and the transmission section further transmits the hierarchical forwarding information generated by the information processing section, in the form of a signal profile of emitted light.

Further, in the information transmission apparatus, preferably, identification information specific to each information transmission apparatus is attached to each of the display information regarding the first information transmission apparatus included in the direct-transmission information and the display information regarding the second information transmission apparatus included in the forwarding information, and the information processing section determines whether or not overlapping identification information is present among the identification information attached to the display information included in the direct-transmission information and the forwarding information, and does not generate forwarding information including display information to which the overlapping identification information is attached, when the overlapping identification information is present.

Further, in the information transmission apparatus, preferably, an alternative transmission via number indicating via how many information transmission apparatuses each forwarding information is transmitted is attached to each forwarding information, and the information processing section updates the alternative transmission via number each time generating the hierarchical forwarding information to increase the number of layers, and discards hierarchical forwarding information to which an alternative transmission via number exceeding a previously permitted predetermined number is attached.

Further, in the information transmission apparatus, preferably, the information processing section sets an upper limit for a data amount in alternative transmission or sets an upper limit for the number of items of forwarding information, and does not generate a portion of forwarding information which exceeds the predetermined upper limit.

Further, in the information transmission apparatus, preferably, the information processing section does not generate forwarding information which does not meet a predetermined condition.

In order to solve the above described problem, the optical wireless communication system of the present invention includes: a reception display apparatus which receives display information in the form of a signal profile of emitted light and superimposes the received display information on an image taken time-sequentially, to display the received display information on a display device; and a plurality of information transmission apparatuses which transmit the display information in the form of a signal profile of emitted light. A first information transmission apparatus of the plurality of information transmission apparatuses includes a storage section, a first reception section, a first measurement section, a first information processing section, and a transmission section. The storage section previously stores at least display information regarding the first information transmission apparatus. The first reception section receives, from a second information transmission apparatus of the plurality of information transmission apparatuses which is different from the first information transmission apparatus, direct-transmission information which is transmitted in the form of a signal profile of emitted light and includes display information regarding the second information transmission apparatus. The first measurement section measures a relative position of the second information transmission apparatus with respect to a transmission position in the first information transmission apparatus. The first information processing section generates direct-transmission information including the display information regarding the first information transmission apparatus previously stored in the storage section, and generates forwarding information which includes relative position information indicating the relative position of the second information transmission apparatus measured by the first measurement section and the display information regarding the second information transmission apparatus included in the direct-transmission information received by the first reception section. The transmission section which transmits the direct-transmission information and the forwarding information which are generated by the first information processing section, in the form of a signal profile of emitted light. The reception display apparatus includes a second reception section, a second measurement section, and a second information processing section. The second reception section time-sequentially takes an image, and receives, from the first information transmission apparatus, direct-transmission information which is transmitted in the form of a signal profile of emitted light and includes the display information regarding the first information transmission apparatus, and forwarding information which is transmitted in the form of a signal profile of emitted light and includes the display information regarding the second information transmission apparatus and one or a plurality of items of relative position information indicating a relative position of the second information transmission apparatus with respect to the first information transmission apparatus. The second measurement section measures a relative position of the first information transmission apparatus with respect to the reception display apparatus. The second information processing section superimposes the display information regarding the first information transmission apparatus included in the direct-transmission information received by the second reception section, such that the display information is associated with a light-emitting position, corresponding to a position of the first information transmission apparatus, on the image taken by the second reception section, and calculates a coordinate position of the second information transmission apparatus on the image taken by the second reception section, on the basis of the light-emitting position, the one or the plurality of items of relative position information included in the forwarding information received by the second reception section, and the relative position of the first information transmission apparatus measured by the second measurement section and superimposes the display information regarding the second information transmission apparatus included in the forwarding information, such that the display information is associated with the coordinate position, to display these display information on the display device.

Further, in order to solve the above described problem, the reception display program of the present invention in a reception display apparatus which receives display information in the form of a signal profile of emitted light and superimposes the received display information on an image taken time-sequentially, to display the received display information on a display device, causes the reception display apparatus to execute a reception step, a measurement step, and an information processing step. The reception step time-sequentially takes an image, and receives, from a first information transmission apparatus, direct-transmission information which is transmitted in the form of a signal profile of emitted light and includes display information regarding the first information transmission apparatus, and forwarding information which is transmitted in the form of a signal profile of emitted light and includes display information regarding a second information transmission apparatus different from the first information transmission apparatus and one or a plurality of items of relative position information indicating a relative position of the second information transmission apparatus with respect to the first information transmission apparatus. The measurement step measures a relative position of the first information transmission apparatus with respect to the reception display apparatus. The information processing step superimposes the display information regarding the first information transmission apparatus included in the direct-transmission information received by the reception step, such that the display information is associated with a light-emitting position, corresponding to a position of the first information transmission apparatus, on the image taken by the reception step, and calculates a coordinate position of the second information transmission apparatus on the image taken by the reception step, on the basis of the light-emitting position, the one or the plurality of items of relative position information included in the forwarding information received by the reception step, and the relative position of the first information transmission apparatus measured by the measurement step and superimposes the display information regarding the second information transmission apparatus included in the forwarding information, such that the display information is associated with the coordinate position, to display these display information on the display device.

Further, in order to solve the above described problem, the information transmission program of the present invention in an information transmission apparatus which transmits, in the form of a signal profile of emitted light, display information which is to be displayed so as to be superimposed on an image taken time-sequentially in a reception apparatus, causes the information transmission apparatus to execute a reception step, a measurement step, an information processing step, and a transmission step. The information transmission apparatus includes a storage section which previously stores at least display information regarding the information transmission apparatus. The reception step receives, from a first information transmission apparatus different from the information transmission apparatus, direct-transmission information which is transmitted in the form of a signal profile of emitted light and includes display information regarding the first information transmission apparatus. The measurement step measures a relative position of the first information transmission apparatus with respect to a transmission position in the information transmission apparatus. The information processing step generates direct-transmission information including the display information regarding the information transmission apparatus previously stored in the storage section, and generates forwarding information which includes relative position information indicating the relative position of the first information transmission apparatus measured by the measurement step and the display information regarding the first information transmission apparatus included in the direct-transmission information received by the reception step. The transmission step transmits the direct-transmission information and the forwarding information which are generated by the information processing step, in the form of a signal profile of emitted light.

Further, in order to solve the above described problem, the reception display integrated circuit of the present invention used in a reception display apparatus which receives display information in the form of a signal profile of emitted light and superimposes the received display information on an image taken time-sequentially, to display the received display information on a display device, integrates all or a part of a portion constructible by an electric circuit, among a reception section, a measurement section, and an information processing section. The reception section time-sequentially takes an image, and receives, from a first information transmission apparatus, direct-transmission information which is transmitted in the form of a signal profile of emitted light and includes display information regarding the first information transmission apparatus, and forwarding information which is transmitted in the form of a signal profile of emitted light and includes display information regarding a second information transmission apparatus different from the first information transmission apparatus and one or a plurality of items of relative position information indicating a relative position of the second information transmission apparatus with respect to the first information transmission apparatus. The measurement section measures a relative position of the first information transmission apparatus with respect to the reception display apparatus. The information processing section superimposes the display information regarding the first information transmission apparatus included in the direct-transmission information received by the reception section, such that the display information is associated with a light-emitting position, corresponding to a position of the first information transmission apparatus, on the image taken by the reception section, and calculates a coordinate position of the second information transmission apparatus on the image taken by the reception section, on the basis of the light-emitting position, the one or the plurality of items of relative position information included in the forwarding information received by the reception section, and the relative position of the first information transmission apparatus measured by the measurement section and superimposes the display information regarding the second information transmission apparatus included in the forwarding information, such that the display information is associated with the coordinate position, to display these display information on the display device.

Further, in order to solve the above described problem, the information transmission integrated circuit of the present invention used in an information transmission apparatus which transmits, in the form of a signal profile of emitted light, display information which is to be displayed so as to be superimposed on an image taken time-sequentially in a reception apparatus, integrates all or a part of a portion constructible by an electric circuit, among a storage section, a reception section, a measurement section, an information processing section, and a transmission section. The storage section previously stores at least display information regarding the information transmission apparatus. The reception section receives, from a first information transmission apparatus different from the information transmission apparatus, direct-transmission information which is transmitted in the form of a signal profile of emitted light and includes display information regarding the first information transmission apparatus. The measurement section measures a relative position of the first information transmission apparatus with respect to a transmission position in the information transmission apparatus. The information processing section generates direct-transmission information including the display information regarding the information transmission apparatus previously stored in the storage section, and generates forwarding information which includes relative position information indicating the relative position of the first information transmission apparatus measured by the measurement section and display information regarding the first information transmission apparatus included in the direct-transmission information received by the reception section. The transmission section transmits the direct-transmission information and the forwarding information which are generated by the information processing section, in the form of a signal profile of emitted light.

Further, in order to solve the above described problem, the optical wireless communication method of the present invention is a method for, in a reception display apparatus, receiving display information in the form of a signal profile of emitted light and superimposing the received display information on an image taken time-sequentially, to display the received display information on a display device, and, in a plurality of information transmission apparatuses, transmitting the display information in the form of a signal profile of emitted light, and includes a first reception step, a first measurement step, a first information processing step, a transmission step, a second reception step, a second measurement step, and a second information processing step. A first information transmission apparatus of the plurality of information transmission apparatuses includes a storage section which previously stores at least display information regarding the first information transmission apparatus. In the first information transmission apparatus, the first reception step receives, from a second information transmission apparatus of the plurality of information transmission apparatuses which is different from the first information transmission apparatus, direct-transmission information which is transmitted in the form of a signal profile of emitted light and includes display information regarding the second information transmission apparatus. In the first information transmission apparatus, the first measurement step measures a relative position of the second information transmission apparatus with respect to a transmission position in the first information transmission apparatus. The first information processing process, in the first information transmission apparatus, generates direct-transmission information including the display information regarding the first information transmission apparatus previously stored in the storage section, and generates forwarding information which includes relative position information indicating the relative position of the second information transmission apparatus measured by the first measurement step and the display information regarding the second information transmission apparatus included in the direct-transmission information received by the first reception step. In the first information transmission apparatus, the transmission step transmits the direct-transmission information and the forwarding information which are generated by the first information processing step, in the form of a signal profile of emitted light. In the reception display apparatus, the second measurement step time-sequentially takes an image, and receives, from the first information transmission apparatus, the direct-transmission information which is transmitted in the form of a signal profile of emitted light and includes the display information regarding the first information transmission apparatus, and the forwarding information which is transmitted in the form of a signal profile of emitted light and includes the display information regarding the second information transmission apparatus and one or a plurality of items of relative position information indicating a relative position of the second information transmission apparatus with respect to the first information transmission apparatus. In the reception display apparatus, the second measurement step measures a relative position of the first information transmission apparatus with respect to the reception display apparatus. In the reception display apparatus, the second information processing step superimposes the display information regarding the first information transmission apparatus included in the direct-transmission information received by the second reception step, such that the display information is associated with a light-emitting position, corresponding to a position of the first information transmission apparatus, on the image taken by the second reception step, and calculates a coordinate position of the second information transmission apparatus on the image taken by the second reception step, on the basis of the light-emitting position, the one or the plurality of items of relative position information included in the forwarding information received by the second reception step, and the relative position of the first information transmission apparatus measured by the second measurement step and superimposes the display information of the second information transmission apparatus included in the forwarding information, such that the display information is associated with the coordinate position, to display these display information on the display device.

Advantageous Effects of the Invention

According to the configuration of the present invention, the reception display apparatus is allowed to obtain the installed position of and the display information regarding an information transmission apparatus that cannot directly visually be recognized, from another information transmission apparatus that can directly visually be recognized, by using optical wireless communication.

According to such a configuration, in the reception display apparatus, display information regarding an information transmission apparatus that cannot directly visually be recognized since a small obstacle is present on a straight line connecting the transmitting side to the receiving side or since the information transmission apparatus is installed behind a construction such as a building, is allowed to be displayed on an image representing a video image taken by a camera, such that the display information corresponds to the installed position of the information transmission apparatus.

BRIEF DESCRIPTION OF THE DRAWINGS

FIG. 8 is a diagram illustrating an example of the contents of transmission information transmitted by the information transmission apparatus 100a.

DESCRIPTION OF EMBODIMENTS

[First Embodiment]
<Outline>

In a first embodiment, in a system which uses information transmission by optical space transmission to display information so as to superimpose the information on a taken image, when: a first information transmission apparatus transmits display information which is to be displayed so as to correspond to the position of a second information transmission apparatus in the taken image, together with relative position information indicating a relative position between the information transmission apparatuses; and a reception display apparatus cannot obtain the display information from the second information transmission apparatus on the basis of change of brightness, direct-transmission information of the second information transmission apparatus and the relative position information which are received from the first information transmission apparatus are used to display the direct-transmission information at the position of an image of the second information transmission apparatus in a superimposed manner.

<Overall Configuration>

Figure 1:
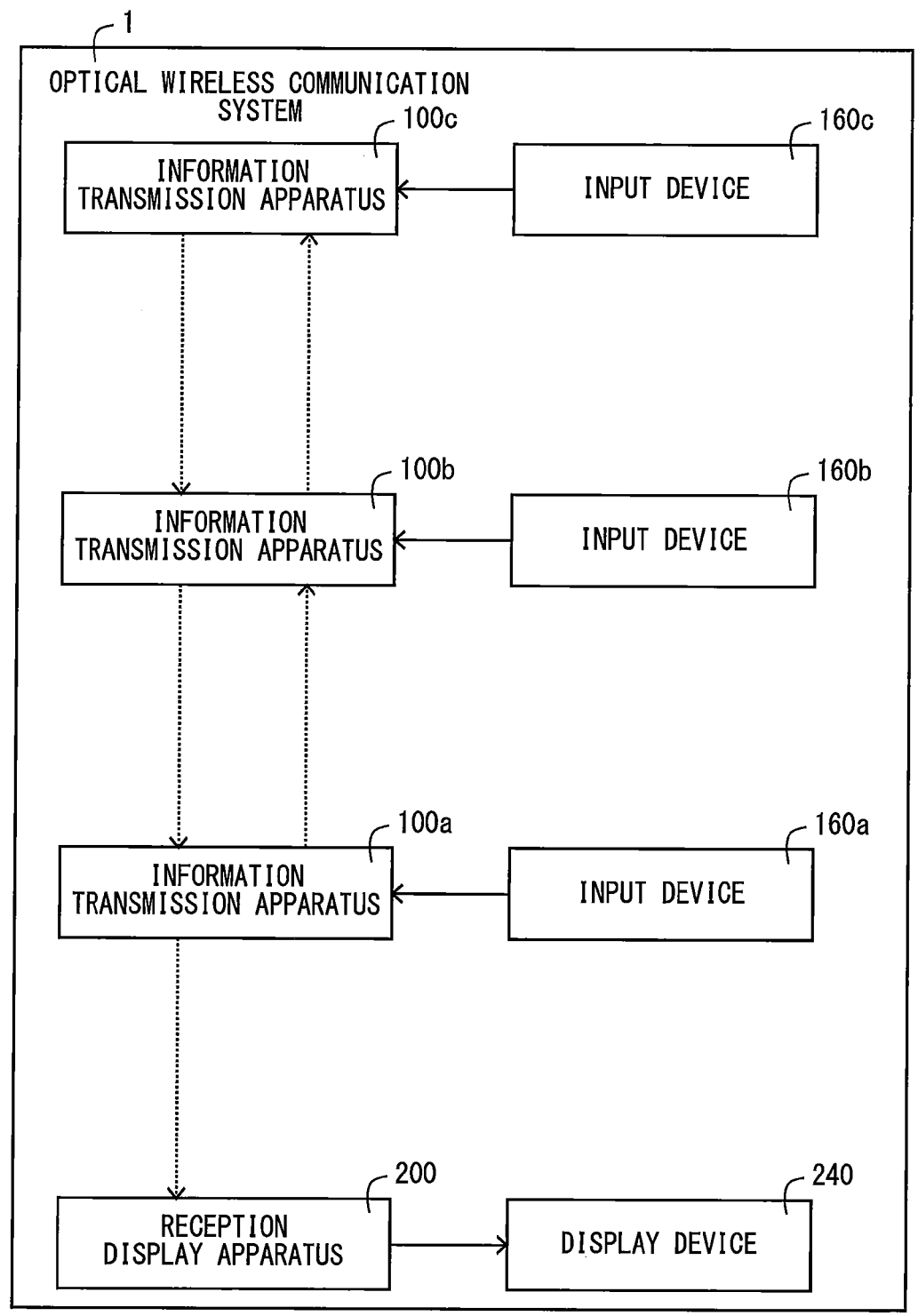
FIG. 1 is a diagram illustrating an outline of an optical wireless communication system 1 of a first embodiment according to the present invention.

FIG. 1 is a diagram illustrating an outline of an optical wireless communication system 1 of the first embodiment according to the present invention.

The optical wireless communication system 1 shown in FIG. 1 is composed of information transmission apparatuses 100a to 100c, input devices 160a to 160c, a reception display apparatus 200, and a display device 240.

The information transmission apparatuses 100a to 100c are, for example, stationary electronic apparatuses which are provided on goods display shelves arranged in shops and at advertisement billboards in town, and have a function to transmit display information which is to be displayed so as to be superimposed on an image taken time-sequentially by the reception display apparatus 200, in the form of a signal profile of emitted light. Here, each of the information transmission apparatuses 100a to 100c not only transmits display information regarding itself but also has a function to receive display information from another apparatus and transmit the display information regarding the other apparatus.

FIG. 1 illustrates the three information transmission apparatuses 100a to 100c, but in reality, a large number of apparatuses are distributed and installed in a wide area.

The input devices 160a to 160c include input devices such as keyboards and external interfaces, and have a function to receive an input from an operator and to obtain data from an external device and an external memory and forward the data to the information transmission apparatuses 100a to 100c. In addition, the input devices 160a to 160c may always be installed, or may be installed only when necessary such as at initial setting and at maintenance.

The reception display apparatus 200 is a mobile terminal which is integrated to, for example, a mobile phone, a car navigation system, or the like and is used by an individual mainly outdoor in a state where the display device 240 is connected thereto. The reception display apparatus 200 receives display information from the information transmission apparatuses 100a to 100c in the form of a signal profile of emitted light, and displays the received display information on the display device 240 so as to superimpose the display information on an image taken time-sequentially. It should be noted that, normally, a plurality of the reception display apparatuses 200 are simultaneously used.

The display device 240 includes an output device such as a liquid crystal display, and outputs a video signal generated by the reception display apparatus 200, onto a screen.

Here, the following description will be given on the assumption that, of the information transmission apparatuses 100a to 100c, only the information transmission apparatus 100a is included in the imaging area of the reception display apparatus 200, only the information transmission apparatus 100b is included in the imaging area of the information transmission apparatus 100a, and only the information transmission apparatus 100c is included in the imaging area of the information transmission apparatus 100b.

<Configuration of Information Transmission Apparatus>

Figure 2:
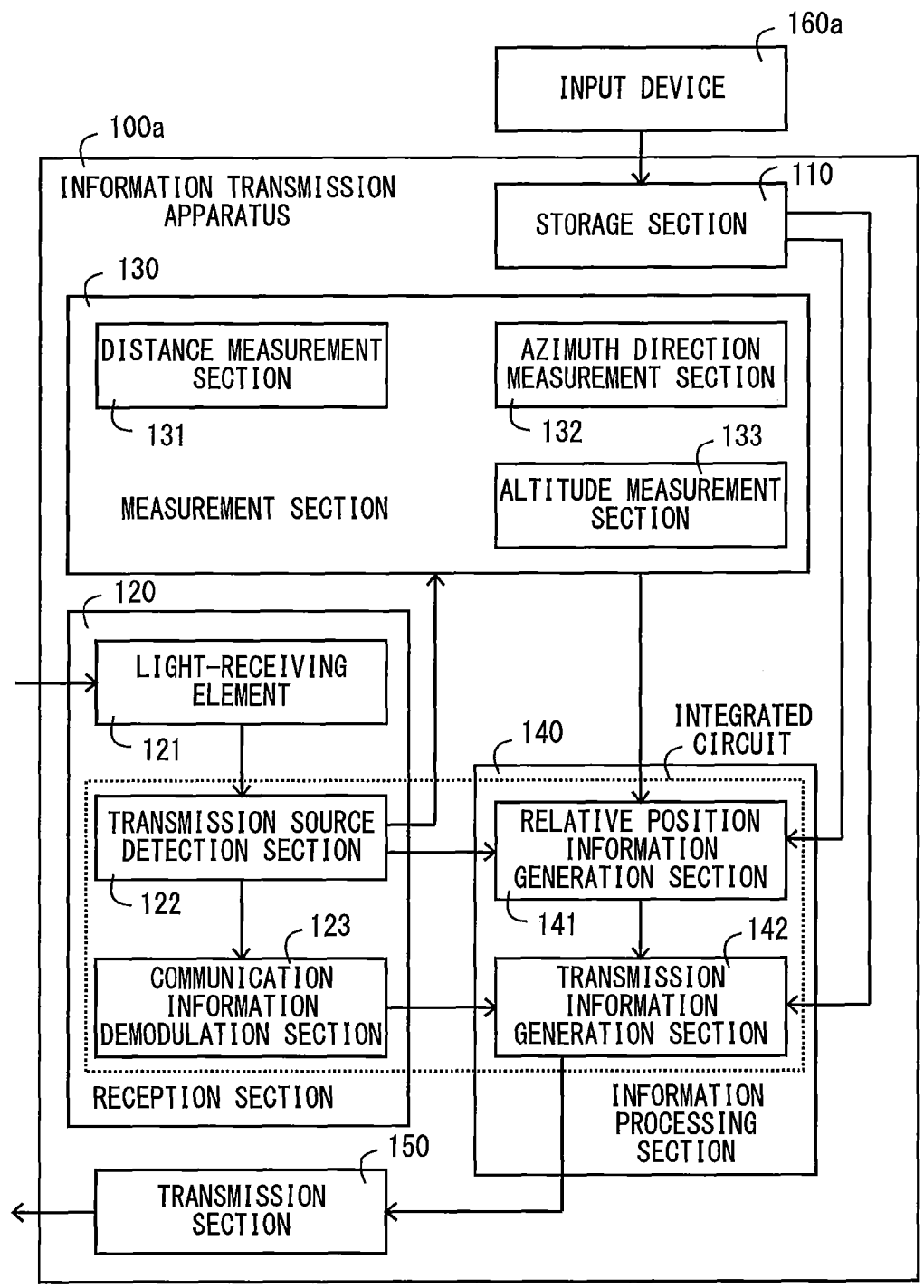
FIG. 2 is a diagram illustrating a schematic functional configuration of an information transmission apparatus 100a according to the embodiment of the present invention.

FIG. 2 is a diagram illustrating a schematic functional configuration of the information transmission apparatus 100a according to the embodiment of the present invention. Here, the functional configurations of the information transmission apparatuses 100b and 100c are the same as that of the information transmission apparatus 100a, and thus the description thereof is omitted.

The information transmission apparatus 100a is an apparatus which transmits, in the form of a signal profile of emitted light, display information which is to be displayed so as to be superimposed on an image taken time-sequentially by the reception display apparatus 200, and includes a storage section 110, a reception section 120, a measurement section 130, an information processing section 140, and a transmission section 150 as shown in FIG. 2.

The storage section 110 previously stores own apparatus setting information.

Here, the own apparatus setting information is information including at least one of the followings (1) to (3).

(1) Display information regarding the information transmission apparatus 100a which is to be displayed by the reception display apparatus 200, such as the name of a location or the name of a facility where the information transmission apparatus 100a is installed.

(2) Information which indicates an azimuth direction in which the information transmission apparatus 100a transmits an optical wireless signal, and which, when transmitted light is diffused in a certain range, may indicate the azimuth direction of the center position of the range.

(3) Information which indicates the height of the location where the information transmission apparatus 100a is installed, and which is desirably information, such as altitude, which is based on a common standard based on which all the information transmission apparatuses 100a to 100c can be represented.

Here, an operator may use the input device 160a to newly set own apparatus setting information in the storage section 110 or to update the own apparatus setting information stored in the storage section 110.

The reception section 120 obtains a video signal per frame to generate image information, and extracts necessary information which is to be transmitted in the form of a signal profile of emitted light, from the image information. Specifically, the reception section 120 receives, from the information transmission apparatus 100b different from the information transmission apparatus 100a, direct-transmission information including display information regarding the information transmission apparatus 100b. Further, the reception section 120 receives, from the information transmission apparatus 100b, forwarding information which is transmitted in the form of a signal profile of emitted light and which includes display information regarding the information transmission apparatus 100c different from the information transmission apparatus 100b and relative position information indicating a relative position of the information transmission apparatus 100c with respect to the information transmission apparatus 100b.

The reception section 120 includes a light-receiving element 121, a transmission source detection section 122, and a communication information demodulation section 123, and the detailed description of the function by each component will be given below.

The light-receiving element 121 includes, for example, an image sensor and a camera, time-sequentially takes an image to generate a video signal, and obtains image information per frame.

The transmission source detection section 122 analyzes the image information obtained from the light-receiving element 121, and detects a light-emitting position of the other information transmission apparatus 100b included in an area of which an image is taken.

It should be noted that in the transmission source detection section 122, for the analysis of the image information, the processing takes time and some cost is required to satisfy necessary specifications as an apparatus. Thus, preprocessing for obtaining the same effect at low cost may be performed, for example, the image information is filter-converted into binary image and then compared.

On the basis of the light-emitting position detected by the transmission source detection section 122 and the image information obtained by the light-receiving element 121, the communication information demodulation section 123 obtains a modulated pulse signal at the position of the transmission source, from the image information, and demodulates the modulated pulse signal into communication data which is data in a form useable in a transmission information generation section 142. Here, when there are a plurality of transmission sources, the communication information demodulation section 123 extracts an optical wireless signal at the position of each transmission source, demodulates the optical wireless signal into communication data, and causes each transmission source to correspond to the demodulated communication data.

The measurement section 130 measures the direct distance to a transmission source, the azimuth direction of the transmission source, and the altitude difference from the transmission source, and detects the relative position between the information transmission apparatus 100a and the transmission source.

The measurement section 130 includes a distance measurement section 131, an azimuth direction measurement section 132, and an altitude measurement section 133, and the detailed description of the function by each component will be given below.

The distance measurement section 131 includes a distance measurement sensor such as an electro-optical distance meter, identifies the direction of a transmission source on the basis of the light-emitting position detected by the transmission source detection section 122, and measures the direct distance to the transmission source. Here, when a plurality of transmission sources are detected, the distance measurement section 131 measures the direct distance to each transmission source, and causes each transmission source to correspond to the measured direct distance.

It should be noted that the distance measurement section 131 may include a second reception section instead of the distance measurement sensor and may obtain a distance by a triangulation technique. In addition, when the reception section has a structure with an automatic focusing lens, a distance may be measured on the basis of a focal distance. In such a case, the automatic focusing function itself corresponds to the distance measurement section, and thus the reception section 120 and the distance measurement section 131 can be regarded as having the same configurations.

The azimuth direction measurement section 132 includes a sensor which detects the direction of a transmission source, and, for example, senses the north direction with an electromagnetic compass, and detects the angle between the north direction and the direction of the transmission source. It should be noted that the north direction may be 0 degree and the angle detected by the azimuth direction measurement section 132 may be represented as a numeric value which is positive in the clockwise direction or negative in the counterclockwise direction.

The altitude measurement section 133 includes a sensor for measuring the altitude difference from a transmission source, and, for example, senses the direction of gravity, detects the angle between the horizontal plane and the direction of a transmission source, and calculates an altitude difference by using the direct distance measured by the distance measurement section 131. It should be noted that the angle detected by the altitude measurement section 133 may be represented as a numeric value which is positive value in the upward direction or negative in the downward direction.

Specifically, the measurement section 130 uses the detected angle between the horizontal plane and the direction of the transmission source and the direct distance to the transmission source to calculate the distance of a horizontal component to the transmission source and the distance (altitude difference) of a vertical component to the transmission source, and further uses the angle between the north direction and the direction of the transmission source and the detected distance of the horizontal component to the transmission source to calculate the distance of a south-north direction component and the distance of an east-west direction component. Specifically, where the angle between the horizontal plane and the direction of the transmission source is "$\phi$" and the direct distance from the information transmission apparatus 100a to the transmission source is "D", the distance of the horizontal component from the information transmission apparatus 100a to the transmission source is "D cos $\phi$", and the altitude difference between the information transmission apparatus 100a and the transmission source is "D sin $\phi$". Further, where the angle between the north direction and the direction of the transmission source is "$\theta$", the distance of the south-north direction component is "(D cos $\phi$)cos $\theta$", and the distance of the east-west direction component is "(D cos $\phi$)sin $\theta$". Here, when detecting the relative position between the information transmission apparatus 100a and the transmission source, the measurement section 130 may output a combination of the distance of the vertical component, the distance of the south-north direction component, and the distance of the east-west direction component, or may output a vector represented on the basis of a combination of the direct distance, the angle "φ" between the horizontal plane and the direction of the transmission source, and the angle "φ" between the north direction and the direction of the transmission source.

The information processing section 140 generates direct-transmission information including display information regarding the information transmission apparatus 100a which is previously stored in the storage section 110, and generates forwarding information including: relative position information which indicates a relative position of the information transmission apparatus 100b measured by the measurement section 130; and the display information regarding the information transmission apparatus 100b which is included in the direct-transmission information received by the reception section 120. In addition, on the basis of the relative position information which indicates the relative position of the information transmission apparatus 100b measured by the measurement section 130 and relative position information regarding the information transmission apparatus 100c which is included in the forwarding information received by the reception section 120, the information processing section 140 generates relative position information indicating a relative position of the information transmission apparatus 100c with respect to the information transmission apparatus 100a, and generates chained forwarding information including: the relative position information generated here; and the display information regarding the information transmission apparatus 100c which is included in the forwarding information received by the reception section 120.

Here, in order to prevent display information regarding the same information transmission apparatus from being redundantly, wastefully, and alternatively transmitted, a specific apparatus ID is assigned to each information transmission apparatus, and when a plurality of items of display information regarding information transmission apparatuses having the same apparatus ID are found, for example, one item of the display information having a smallest number (alternative transmission via number) of information transmission apparatuses via which the display information is alternatively transmitted may be left, and the other items of the display information may be deleted.

In addition, in order to prevent delay of processing or an excessive load from occurring due to chained forwarding being endlessly performed, an upper limit may be set for a data amount in alternative transmission, and a portion of forwarding information which exceeds the upper limit may not be generated. For example, alternative transmission data may temporarily be stored in a predetermined data area in order of reception thereof, and when the data area becomes filled, alternative transmission data received later may be discarded. Alternatively, for example, a priority may be attached to alternative transmission data in accordance with importance of the alternative transmission data, and when a data amount reaches the upper limit, alternative transmission data may be discarded in order from data having a low priority. Still alternatively, an upper limit is not set for a data amount, and an upper limit may be set for an alternative transmission via number indicating via how many information transmission apparatuses alternative transmission is performed. Specifically, an alternative transmission via number is attached to each item of forwarding information, and the information processing section 140 updates the alternative transmission via number each time chained forwarding information is generated and the number of times of forwarding increases, and discards chained forwarding information to which an alternative transmission via number exceeding a previously permitted predetermined number is attached. Still alternatively, an upper limit may be set for the number of items of forwarding information, and a portion of forwarding information which exceeds the upper limit may not be generated.

Here, in an example of a method for setting an upper limit for a data amount, a value obtained by dividing an effective bit rate at which communication is possible in optical wireless communication, by a refresh rate of rendering in the reception display apparatus 200 can be set as an update rate of information. For example, where the effective bit rate of optical wireless communication is 300 Mbps and the refresh rate of rendering in the reception display apparatus 200 is 30 fps, it is 10 Mbit (≈1280 Kbyte) per frame.

Further, in order to prevent transmission of information that is not worthy of alternative transmission due to a low possibility that the information will be utilized, forwarding information that does not meet a predetermined condition may not be generated. For example, there is a low possibility that information regarding a distant information transmission apparatus will be utilized, and thus information regarding an information transmission apparatus having a relative distance larger than a specified value (e.g., 100 m) is deleted. Further, for example, since time taken for reception is wasted when an error occurs, information having an optical intensity equal to or less than a specified value when being received is deleted. Moreover, for example, display information regarding an information transmission apparatus that is present in a direction different from an imaging direction (e.g., in a range of wide angle imaging with a diameter of about 35 mm) is deleted.

Further, information that corresponds to a certain purpose may selectively and alternatively be transmitted. For example, an event ID which identifies an area-restricted event is assigned to display information, and only an information transmission apparatus in a designated area can be permitted to alternatively transmit display information to which a specific event ID is assigned.

The information processing section 140 includes a relative position information generation section 141 and the transmission information generation section 142, and the detailed description of the function by each component will be given below.

On the basis of the direct-transmission information obtained by the reception section 120 and the relative position between the information transmission apparatus 100a and the transmission source which is detected by the measurement section 130, the relative position information generation section 141 generates relative position information indicating a relative position of the transmission source with respect to a transmission position in the information transmission apparatus 100a.

Further, on the basis of the forwarding information obtained by the reception section 120 and the relative position between the information transmission apparatus 100a and the transmission source which is detected by the measurement section 130, the relative position information generation section 141 generates chained relative position information indicating a relative position of the transmission source with respect to the transmission position in the information transmission apparatus 100a.

The transmission information generation section 142 generates transmission information which is to be transmitted, by using the relative position information and the chained relative position information which are generated by the relative position information generation section 141. The data structure of the transmission information will be described in detail below.

The transmission section 150 includes a light-emitting element which transmits a signal by blinking infrared light, a laser beam, or visible light, such as a light emitting diode (LED) or an infrared laser emitting element, and modulates the transmission information generated by the transmission information generation section 142, into an optical wireless signal and transmits the optical wireless signal.

It should be noted that of each component of the information transmission apparatus 100a, a part or the entirety of a potion that can be constructed by an electric circuit such as a logic circuit and a memory may be integrated into an integrated circuit such as one or more of semiconductor elements. Specifically, the components of the reception section 120 and the measurement section 130 which can be constructed by a logic circuit, except independent devices such as the light-receiving element 121 in the reception section 120 and each sensor in the measurement section 130, and the components of the information processing section 140 may be integrated into an integrated circuit. For example, in FIG. 2, the transmission source detection section 122, the communication information demodulation section 123, the relative position information generation section 141, and the transmission information generation section 142, which are enclosed by a dotted line, can be integrated into an integrated circuit.

<Configuration of Reception Display Apparatus>

Figure 3:
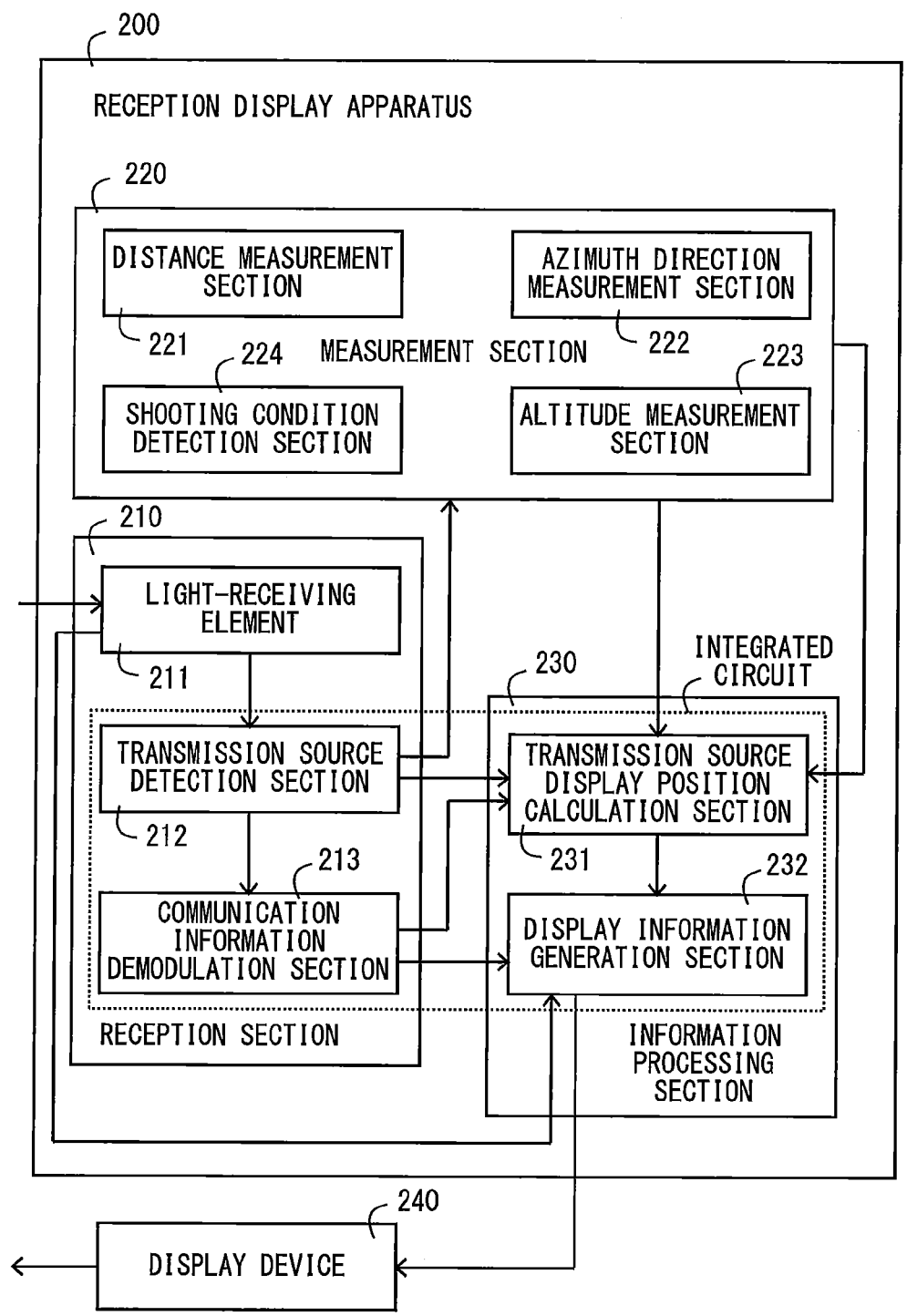
FIG. 3 is a diagram illustrating a functional configuration of a reception display apparatus 200 according to the embodiment.

FIG. 3 is a diagram illustrating a functional configuration of the reception display apparatus 200 according to the present embodiment.

The reception display apparatus 200 is an apparatus which receives display information in the form of a signal profile of emitted light and superimposes the received display information on an image taken time-sequentially, to display the display information on a display device, and includes a reception section 210, a measurement section 220, and an information processing section 230 as shown in FIG. 3.

The reception section 210 obtains a video signal per frame to generate image information, and extracts necessary information which is to be transmitted in the form of a signal profile of emitted light, from the image information. Specifically, the reception section 210 receives, from the information transmission apparatus 100a, direct-transmission information including display information regarding the information transmission apparatus 100a. In addition, the reception section 210 receives, from the information transmission apparatus 100a, the forwarding information which includes the display information regarding the information transmission apparatus 100b and one item of the relative position information indicating the relative position of the information transmission apparatus 100b with respect to the information transmission apparatus 100a. Moreover, the reception section 210 receives, from the information transmission apparatus 100a, the forwarding information which includes the display information regarding the information transmission apparatus 100c and a plurality of items of the relative position information indicating the relative position of the information transmission apparatus 100c with respect to the information transmission apparatus 100a.

The reception section 210 includes a light-receiving element 211, a transmission source detection section 212, and a communication information demodulation section 213, and the detailed description of the function by each component will be given below.

The light-receiving element 211 includes, for example, an image sensor and a camera, time-sequentially takes an image to generate a video signal, and obtains image information per frame.

The transmission source detection section 212 analyzes the image information obtained from the light-receiving element 211, and detects a light-emitting position of the information transmission apparatus 100a included in an area of which an image is taken.

On the basis of the light-emitting position detected by the transmission source detection section 212 and the image information obtained by the reception section 210, the communication information demodulation section 213 obtains a modulated pulse signal at the position of a transmission source, from the image information, and demodulates the modulated pulse signal into communication data which is data in a form useable in a display information generation section 232. Here, when there are a plurality of transmission sources, the communication information demodulation section 213 extracts an modulated pulse signal in optical wireless communication at the position of each transmission source, and causes each transmission source to correspond to demodulated data.

The measurement section 220 measures the direct distance to a transmission source, the azimuth direction of the transmission source, and the altitude difference from the transmission source, detects the relative position between the reception display apparatus 200 and the transmission source, and further detects a shooting condition.

The measurement section 220 includes a distance measurement section 221, an azimuth direction measurement section 222, an altitude measurement section 223, and a shooting condition detection section 224, and the detailed description of the function by each component will be given below.

The distance measurement section 221 includes a distance measurement sensor such as an electro-optical distance meter, identifies the direction of a transmission source on the basis of the light-emitting position detected by the transmission source detection section 212, and measures the direct distance to the transmission source in this direction. Here, when a plurality of transmission sources are detected, the distance measurement section 221 measures the direct distance to each transmission source, and causes each transmission source to correspond to the measured direct distance.

The azimuth direction measurement section 222 includes a sensor for detecting the direction of a transmission source, and, for example, senses the north direction with an electromagnetic compass, and detects the angle between the north direction and the direction of the transmission source. It should be noted that the north direction may be 0 degree and the angle detected by the azimuth direction measurement section 222 may be represented as a numeric value which is positive in the clockwise direction or negative in the counterclockwise direction based on the north direction.

The altitude measurement section 223 is a sensor for measuring the altitude difference from a transmission source, and, for example, senses the direction of gravity, detects the angle between the horizontal plane and the direction of the transmission source, and calculates an altitude difference by using the direct distance measured by the distance measurement section 221. It should be noted that the angle detected by the altitude measurement section 223 may be represented as a numeric value which is positive in the upward direction or negative in the downward direction.

The shooting condition detection section 224 detects a shooting condition such as a direction in which an image is taken, an inclination in the vertical direction, an inclination in the horizontal direction, and magnification for taking an image, and determines which direction the position of each pixel in the image information obtained by the light-receiving element 211 corresponds to.

Specifically, the measurement section 220 uses the detected angle between the horizontal plane and the direction of the transmission source and the direct distance to the transmission source to calculate the distance of a horizontal component to the transmission source and the distance (altitude difference) of a vertical component to the transmission source, and further uses the detected distance of the horizontal component to the transmission source and the angle between the north direction and the direction of the transmission source to calculate a distance in the south-north direction and a distance in the east-west direction. The specific calculation method is the same as that of the measurement section 130 of the information transmission apparatus 100a.

The information processing section 230 superimposes the display information regarding the information transmission apparatus 100a which is included in the direct-transmission information received by the reception section 210, such that the display information is associated with a light-emitting position, corresponding to the position of the information transmission apparatus 100a, on the image taken by the reception section 210, to display the display information on the display device 240. In addition, the information processing section 230 calculates a coordinate position of the information transmission apparatus 100b on the image taken by the reception section 210, on the basis of: the light-emitting position; the one or the plurality of items of the relative position information received by the reception section 210; and the relative position of the information transmission apparatus 100a measured by the measurement section 220, and superimposes the display information regarding the information transmission apparatus 100b which is included in the forwarding information, such that the display information is associated with the coordinate position, to display the display information on the display device 240.

The information processing section 230 includes a transmission source display position calculation section 231, and the display information generation section 232, and the detailed description of the function by each component will be given below.

The transmission source display position calculation section 231 calculates a display position of each transmission source in a screen region displayed on the display device 240. Specifically, the transmission source display position calculation section 231 calculates, for each transmission source, the distance of a vertical component to the transmission source, the distance in the south-north direction to the transmission source, and the distance in the east-west direction to the transmission source, and, according to need, calculates the sum of the distances of the vertical components to the transmission sources, the sum of the distances in the south-north direction to the transmission sources, and the sum of the distances in the east-west direction to the transmission sources. On the basis of a combination of them, the transmission source display position calculation section 231 performs calculation reverse to the calculation of the measurement section 130 and the measurement section 220, to calculate a combination of the direct distance, the angle "φ" between the horizontal plane and the direction of the transmission source, and the angle "θ" between the north direction and the direction of the transmission source, and then determines the position of a pixel corresponding to the angle "φ" and the angle "θ" on the basis of the correspondence relation between the position and the direction of each pixel determined by the shooting condition detection section 224.

It should be noted that when the relative position information included in the forwarding information and the relative position detected by the measurement section 220 are represented by vectors, respectively, the relative position of the transmission source with respect to the reception display apparatus 200 can be calculated as one vector by combining these vectors.

The display information generation section 232 superimposes the data demodulated by the communication information demodulation section 213, such that the data corresponds to the display position, calculated by the transmission source display position calculation section 231, on the image displayed on the basis of the image information obtained by the reception section 210, to generate display information, and converts the display information into a video signal.

The video signal converted by the display information generation section 232 is outputted to the display device 240.

It should be noted that of each component of the reception display apparatus 200, a part or the entirety of a potion that can be constructed by an electric circuit such as a logic circuit and a memory may be integrated into an integrated circuit such as one or more of semiconductor elements. Specifically, the components of the reception section 210 and the measurement section 220 which can be constructed by a logic circuit, except independent devices such as the light-receiving element 211 in the reception section 210 and each sensor in the measurement section 220, and the components of the information processing section 230 may be integrated into an integrated circuit. For example, in FIG. 3, the transmission source detection section 212, the communication information demodulation section 213, the transmission source display position calculation section 231, and the display information generation section 232, which are enclosed by a dotted line, can be integrated into an integrated circuit.

<Data Structure of Transmission Information>

Figure 4:
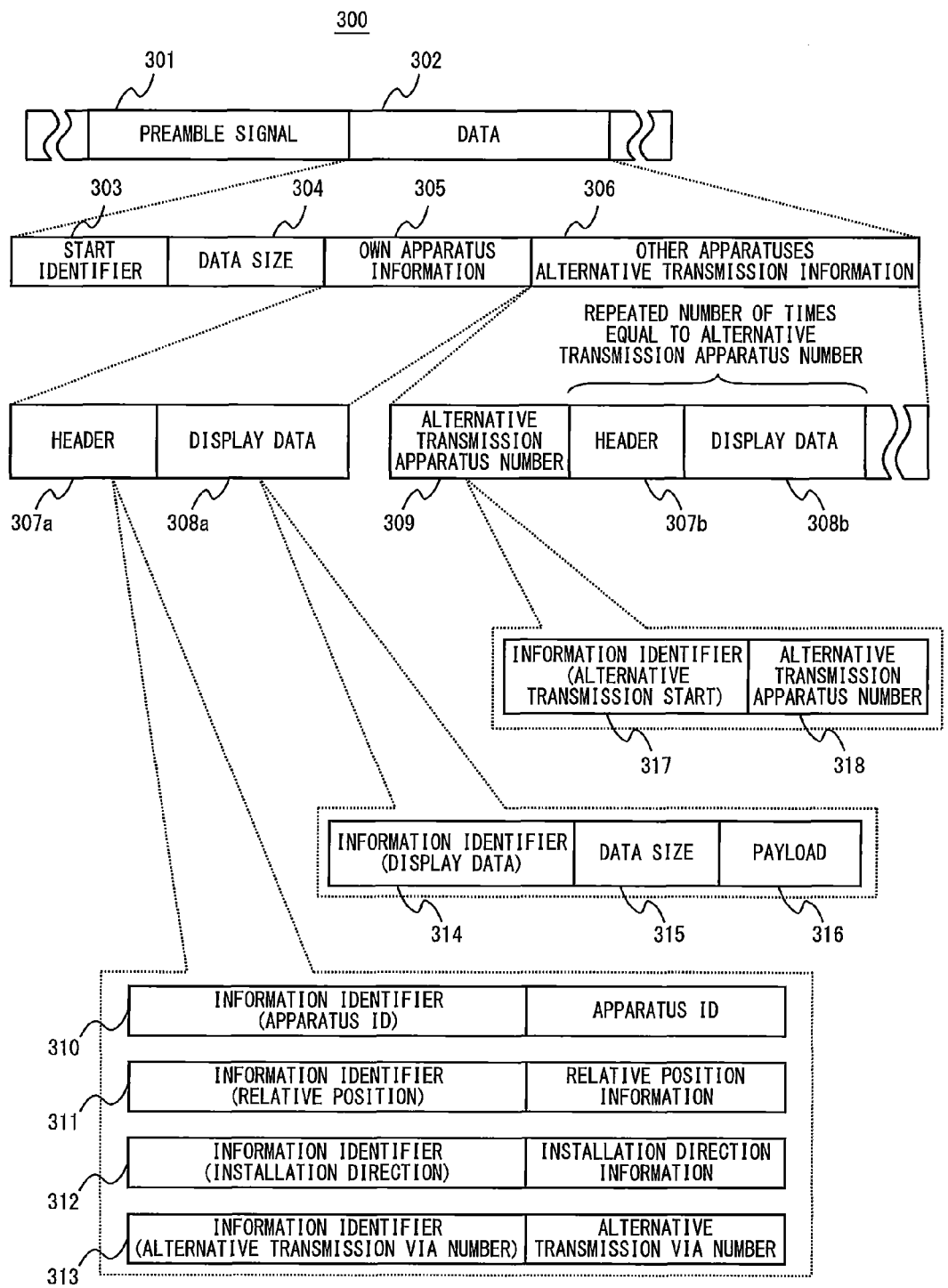
FIG. 4 is a diagram illustrating an example of the data structures of transmission information which is transmitted and received by information transmission apparatuses 100a to 100c according to the embodiment of the present invention.

FIG. 4 is a diagram illustrating an example of the data structures of transmission information which is transmitted and received by the information transmission apparatuses 100a to 100c according to the embodiment of the present invention. Hereinafter, the transmission information generated by the transmission information generation section 142 will be described with reference to FIG. 4.

Transmission information 300 is composed of a preamble signal 301 for identifying the start position of data and data 302 following the preamble signal 301. When the communication information demodulation section 123 of the information transmission apparatus 100a detects the preamble signal 301, the communication information demodulation section 123 identifies the start position of the transmission information and demodulates the following data 302.

The data 302 is composed of a start identifier 303, a data size 304, own apparatus information 305, and other apparatus alternative transmission information 306.

The start identifier 303 is information for identifying the start position of the data 302. When the communication information demodulation section 123 of the information transmission apparatus 100a detects the start identifier 303, the communication information demodulation section 123 identifies that the data structures of the data size 304, the own apparatus information 305, and the other apparatus alternative transmission information 306 follow, and performs subsequent processing.

The data size 304 is a parameter indicating the sum of the data size of the following own apparatus information 305 and the data size of the following other apparatus alternative transmission information 306.

The own apparatus information 305 is information for transmitting direct-transmission information regarding an information transmission apparatus body that is the own apparatus.

The other apparatus alternative transmission information 306 is information for alternatively transmitting forwarding information regarding another information transmission apparatus installed in a location different from that of the own apparatus, and is generated on the basis of position information regarding where the other information transmission apparatus is detected, or transmission information transmitted from the other information transmission apparatus.

More specifically, the own apparatus information 305 is composed of a header 307*a* and display data 308*a*.

The header 307*a* is attribute information common in information transmission apparatuses, such as the apparatus ID and the installation direction of an information transmission apparatus. Attribute information put in the area of the header 307*a* is composed of an information identifier for identify what attribute information it indicates, and a parameter indicating a value of the attribute information. For example, when the header 307*a* indicates the apparatus ID of the information transmission apparatus (in the case of 310 in FIG. 4), an information identifier indicating that it is an apparatus ID and the apparatus ID are put in the area of the header 307*a*. In addition, for example, when the header 307*a* indicates a relative position (in the case of 311 in FIG. 4), an information identifier indicating that it is a relative position and relative position information are put in the area of the header 307*a*. Further, for example, when the header 307*a* indicates an installation direction (in the case of 312 in FIG. 4), an information identifier indicating that it is an installation direction and installation direction information are put in the area of the header 307*a*. Moreover, for example, when the header 307*a* indicates an alternative transmission via number (in the case of 313 in FIG. 4), an information identifier indicating that it is an alternative transmission via number and the alternative transmission via number are put in the area of the header 307*a*.

The display data 308*a* is data for performing display on the display screen of the reception display apparatus 200 so as to be associated with the position where an information transmission apparatus is installed. Any information for display, such as the address of a location and the name of a shop where an information transmission apparatus is installed, and information regarding a campaign, can be transmitted. More specifically, the display data 308*a* is composed of an information identifier 314 indicating that it is display data, a data size 315 which is a value indicating the data size of the contents of the display data, and a payload 316 which is the contents of the display data.

More specifically, the other apparatus alternative transmission information 306 is composed of an alternative transmission apparatus number 309, a header 307*b* corresponding to an information transmission apparatus for which alternative transmission is performed, and display data 308*b*.

In the area of the alternative transmission apparatus number 309, the number of information transmission apparatuses that are targeted for alternative transmission and installed in locations different from that of the own apparatus, is put. More specifically, an information identifier 317 which indicates the start of information indicating alternative transmission and indicates that the value of the alternative transmission apparatus number follows, is put therein, and an alternative transmission apparatus number 318 is subsequently put therein.

The header 307*b* and the display data 308*b* are attribute information and display data which correspond to the information transmission apparatuses that are targeted for alternative transmission and installed in the locations different from that of the own apparatus. A data structure is provided which has a number of following repeat units of the header 307*b* and the display data 308*b* which number is equal to the value indicated by the alternative transmission apparatus number 309.

The configuration of the header 307*b* is the same as that of the header 307*a*. In the case of alternative transmission, relative position information 311 indicating a relative position between an information transmission apparatus and an information transmission apparatus targeted for alternative transmission, and an alternative transmission via number 313 indicating via how many information transmission apparatuses alternative transmission is performed, are also information to be put in the header 307*b*.

Use of such transmission information 300 allows transmitted transmission information and a relative position between the own apparatus and an information transmission apparatus, installed in a location different from that of the own apparatus, to be alternatively transmitted.

<Operation of Information Transmission Apparatus>

Figure 5:
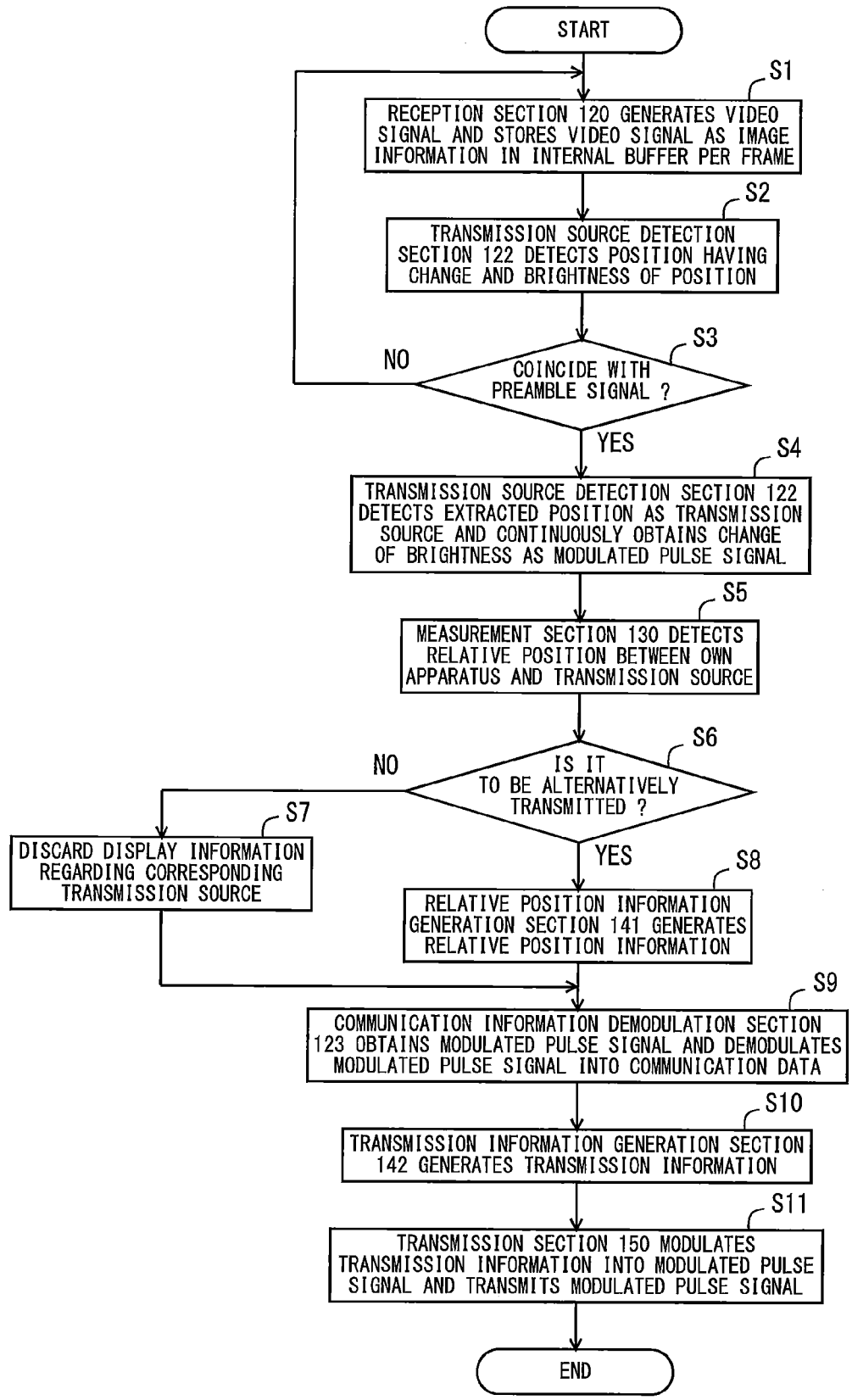
FIG. 5 is a diagram illustrating the procedure of an information transmission method in the information transmission apparatus 100a according to the embodiment.

FIG. 5 is a diagram illustrating the procedure of an information transmission method in the information transmission apparatus 100*a* according to the present embodiment.

(1) The reception section 120 time-sequentially takes an image to generate a video signal per frame rate, and stores the video signal as image information in an internal buffer per frame (step S1).

(2) At the time when image information of the next frame is stored by the reception section 120, the transmission source detection section 122 compares the one frame of the newly stored image information to the one frame of the image information that is stored in the internal buffer and is one item before, and detects a position having a change and the brightness of the position. More specifically, the transmission source detection section 122 detects a position, in a modulated pulse signal used in optical wireless communication, where a brightness indicating "1" and a brightness indicating "0" are changed, and internally records the change of the brightness in the detected position, as a signal, such that the change corresponds to the detected position (step S2).

(3) The transmission source detection section 122 determines whether or not the change of the brightness in the position extracted at step S2 coincides with the preamble signal of the modulated pulse signal used in optical wireless communication (step S3). When the change does not coincide with the preamble signal (step S3: NO), steps S1 to S3 are repeated until the change coincides with the preamble signal.

(4) When the change coincides with the preamble signal (step S3: YES), the transmission source detection section 122 detects the extracted position as a transmission source and infers that the extracted position is a location where an information transmission apparatus is installed. In addition, the transmission source detection section 122 continuously obtains change of brightness in the detected transmission source, as a modulated pulse signal transmitted from the transmission source (step S4).

(5) The measurement section 130 measures the direct distance to the transmission source detected at step S4, and the azimuth direction of the transmission source, and the altitude difference from the transmission source, and detects the relative position between the information transmission apparatus 100*a* and the transmission source (step S5).

(6) It is determined whether or not display information regarding the detected transmission source is to be alternatively transmitted (step S6). Here, the determination as to whether or not it is to be alternatively transmitted is performed, for example, on the basis of whether, among display information forwarded via other transmission sources, items of the display information having the same apparatus ID are present, whether an alternative transmission via number exceeds a previously permitted predetermined number, whether a data amount or the number of times of forwarding information exceeds an upper limit, and whether a predetermined condition is met.

(7) When it is determined that it is not to be alternatively transmitted (step S6: NO), the display information regarding the corresponding transmission source is discarded, and a subsequent process of alternative transmission on the corresponding transmission source is inhibited (step S7).

(8) When it is determined that it is to be alternatively transmitted (step S6: YES), the relative position information generation section 141 generates relative position information indicating a relative position of the transmission source, on the basis of the forwarding information obtained by the reception section 120 and the relative position between the information transmission apparatus 100*a* and the transmission source which is detected by the measurement section 130 (step S8).

(9) On the basis of the light-emitting position detected by the transmission source detection section 122 and the image information obtained by the light-receiving element 121, the communication information demodulation section 123 obtains a modulated pulse signal at the position of the transmission source, from the image information, and demodulates the modulated pulse signal into communication data which is data in a form useable in subsequent processes (step S9).

(10) The transmission information generation section 142 generates transmission information which is to be transmitted from the information transmission apparatus 100*a* (step S10).

Specifically, first, the transmission information generation section 142 extracts at least the apparatus ID and the display data which is to be used in the reception display apparatus 200, from the contents of the own apparatus setting information stored in the storage section 110, and generates direct-transmission information such that the direct-transmission information has such a size as to be able to be put within the structure of the own apparatus information 305 in the transmission information 300 shown in FIG. 4.

Further, the transmission information generation section 142 extracts at least the apparatus ID and the display data which is to be used in the reception display apparatus 200, from the contents of the communication data of the transmission source demodulated by the communication information demodulation section 123, and generates forwarding information such that the forwarding information has such a size as to be able to be put within the structure of the other apparatus alternative transmission information 306 of the transmission information 300 shown in FIG. 4.

Further, on the basis of the relative position information which is generated by the relative position information generation section 141 and corresponds to the transmission source, the transmission information generation section 142 generates chained forwarding information such that the chained forwarding information similarly has such a size as to be able to be put within the structure of the other apparatus alternative transmission information 306.

Moreover, when a plurality of transmission sources are detected, the transmission information generation section 142 generates transmission information regarding each transmission source and connects the transmission information to one another, and replaces the value of the alternative transmission apparatus number 318 with the number of information transmission apparatuses for which alternative transmission is performed.

It should be noted that at that time, when the obtained apparatus ID is the same as the apparatus ID indicating the information transmission apparatus 100*a*, alternative transmission information corresponding to the apparatus ID is not used. By so doing, information regarding the information transmission apparatus 100*a* can be prevented from being redundantly transmitted.

Further, when the apparatus ID (B) of a transmission source A which is included in communication data received from the transmission source A is the same as the second apparatus ID (D) of a transmission source which is alternatively transmitted and included in communication data received from a transmission source C installed in another location, alternative transmission information corresponding to the apparatus ID (D) which is alternatively transmitted from the transmission source C is not used. By so doing, alternative transmission information of the same transmission source can be prevented from being redundantly transmitted.

(11) The transmission section 150 modulates the transmission information generated at step S10, into a modulated pulse signal which is to be transmitted by using optical wireless communication, and transmits the modulated pulse signal by using the light-emitting element (step S11).

By repeating the processes described above, the information transmission apparatus 100*a* is allowed to alternatively transmit, together with the transmission information of the information transmission apparatus 100*a*, communication data of an information transmission apparatus (the information transmission apparatus 100*b* and the information transmission apparatus 100*c* in FIG. 1) installed in another location.

<Operation of Reception Display Apparatus>

Figure 6:
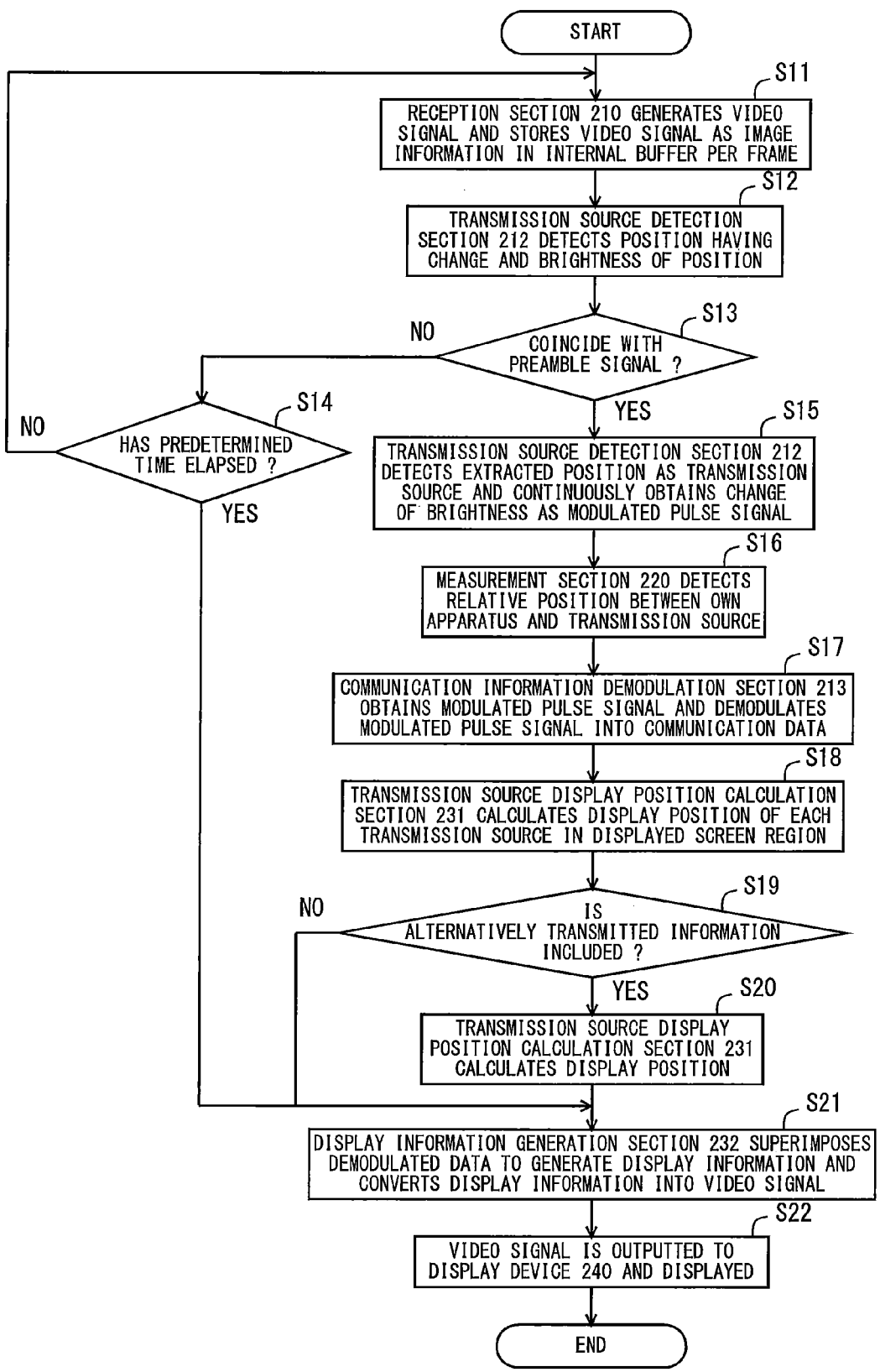
FIG. 6 is a diagram illustrating the procedure of a reception display method in the reception display apparatus 200 according to the embodiment.

FIG. 6 is a diagram illustrating the procedure of a reception display method in the reception display apparatus 200 according to the present embodiment.

(1) The reception section 210 time-sequentially takes an image to generate a video signal per frame rate, and stores the video signal as image information in an internal buffer per frame (step S11).

(2) At the time when image information of the next frame is stored by the reception section 210, the transmission source detection section 212 compares the one frame of the newly stored image information to the one frame of the image information that is stored in the internal buffer and is one item before, and detects a position having a change and the brightness of the position. More specifically, the transmission source detection section 212 detects a position, in a modulated pulse signal used in optical wireless communication, where a brightness indicating "1" and a brightness indicating "0" are changed, and internally records the change of the brightness in the detected position, as a signal, such that the change corresponds to the detected position (step S12).

(3) The transmission source detection section 212 determines whether or not the change of the brightness in the position extracted at step S12 coincides with the preamble signal of the modulated pulse signal used in optical wireless communication (step S13). When the change does not coincide with the preamble signal (step S13: NO), steps S11 to S13 are repeated until the change coincides with the preamble signal.

(4) The transmission source detection section 212 determines whether or not a predetermined time has elapsed without detecting any transmission source (step S14). When no transmission source is detected within the predetermined time (step S13: NO, step S14: YES), processes at subsequent steps S15 to S20 are skipped.

(5) When the change coincides with the preamble signal (step S3: YES), the transmission source detection section 212 detects the extracted position as a transmission source and infers that the extracted position is a location where an information transmission apparatus is installed. In addition, the transmission source detection section 212 continuously obtains change of brightness in the detected transmission source, as a modulated pulse signal transmitted from the transmission source (step S15).

(6) The measurement section 220 measures the direct distance to the transmission source detected at step S15, the azimuth direction of the transmission source, and the altitude difference from the transmission source, and detects the relative position between the reception display apparatus 200 and the transmission source (step S16).

(7) On the basis of the light-emitting position detected by the transmission source detection section 212 and the image information obtained by the light-receiving element 211, the communication information demodulation section 213 obtains a modulated pulse signal at the position of the transmission source, from the image information, and demodulates the modulated pulse signal into communication data which is data in a form useable in subsequent processes (step S17).

(8) The transmission source display position calculation section 231 calculates a display position of each transmission source in a screen region displayed on the display device 240 (step S18).

(9) The transmission source display position calculation section 231 refers to the communication data demodulated by the communication information demodulation section 213, and determines whether or not alternatively transmitted information is included (step S19). When no alternatively transmitted information is included, the process at step S20 is skipped.

(10) The transmission source display position calculation section 231 calculates a display position of display information of the information transmission apparatus which is alternatively transmitted and is to be displayed on the display device 240 (step S20).

(11) The display information generation section 232 superimposes the data demodulated by the communication information demodulation section 213, such that the data corresponds to the display position, calculated by the transmission source display position calculation section 231, on the image displayed on the basis of the image information obtained by the reception section 210, to generate display information, and converts the display information into a video signal (step S21). For example, the display information generation section 232 superimposes display objects, such as a marker and balloon indicating the detected transmission source and the information transmission apparatus for which alternative transmission is performed, on the obtained image information, displays corresponding display data, as the contents of the balloons, such that the display data is associated with these display objects, and causes the display data to correspond to a detailed content which is displayed when a user selects the marker, thereby generating display information as appropriate.

(12) The video signal converted by the display information generation section 232 is outputted to the display device 240 and displayed (step S22).

<Example of Use of Optical Wireless Communication System>

Figure 7:
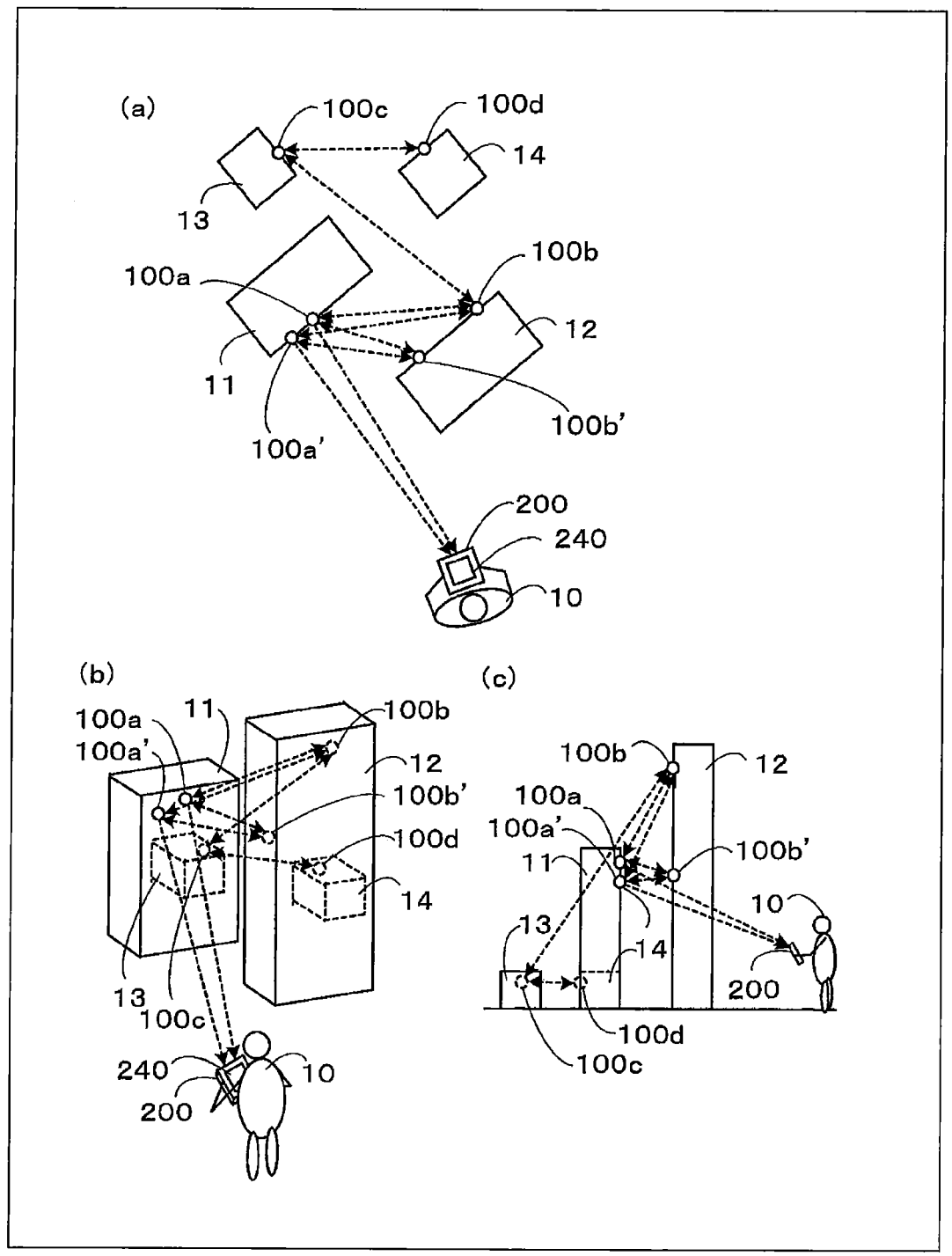
FIG. 7 is a diagram illustrating an example of use of the optical wireless communication system according to the embodiment, (a) illustrates a view obtained when objects are seen from directly above, (b) illustrates a view obtained when the objects are seen from above on the south side, and (c) illustrates a view obtained when the objects are seen from the southeast direction.

(a) to (c) of FIG. 7 are diagrams illustrating an example of use of the optical wireless communication system according to the present embodiment. Here, (a) of FIG. 7 is a view obtained when objects are seen from directly above, and the upper direction in the drawing is north. In addition, (b) of FIG. 7 is a view obtained when the objects are seen from above on the south side, and (c) FIG. 7 is a view obtained when the objects are seen from the southeast direction.

As shown in (a) to (c) of FIG. 7, a user 10 holding the reception display apparatus 200 to which the display device 240 is connected, and constructions 11 to 14 assuming buildings or the like, stand in an arrangement as shown in the drawing and facing in directions, respectively, as shown in the drawing.

Further, in the construction 11, the information transmission apparatus 100a and an information transmission apparatus 100a' are installed in such positions that reception is possible from the reception display apparatus 200, as shown in the drawing, and in the construction 12, the information transmission apparatus 100b and an information transmission apparatus 100b' are installed in such positions that transmission and reception are possible from the information transmission apparatus 100a and the information transmission apparatus 100a' and reception is possible from the reception display apparatus 200, as shown in the drawing. In addition, in the construction 13, the information transmission apparatus 100c is installed in such a position that transmission and reception are possible only from the information transmission apparatus 100b, as shown in the drawing. Moreover, in the construction 14, an information transmission apparatus 100d is installed in such a position that transmission and reception are possible only from the information transmission apparatus 100c, as shown in the drawing.

Here, all the information transmission apparatuses in (a) to (c) of FIG. 7 are set so as to have hemispherical transmission/reception possible ranges of angles less than 180 degrees, and the upper limits for the alternative transmission via number are set to 2.

Hereinafter, an example of use of the optical wireless communication method by the optical wireless communication system will be described focusing on the information transmission apparatus 100a.

The information transmission apparatus 100a receives, from the information transmission apparatus 100b, (1) direct-transmission information A including display information regarding the information transmission apparatus 100b, (2) forwarding information B including display information regarding the information transmission apparatus 100c and one item of relative position information indicating a relative position of the information transmission apparatus 100c with respect to the information transmission apparatus 100b, (3) forwarding information C including display information regarding the information transmission apparatus 100d and two items of relative position information indicating a relative position of the information transmission apparatus 100d with respect to the information transmission apparatus 100b, (4) forwarding information D including display information regarding the information transmission apparatus 100a and one item of relative position information indicating a relative position of the information transmission apparatus 100a with respect to the information transmission apparatus 100b, (5) forwarding information E including display information regarding the information transmission apparatus 100b' and two items of relative position information indicating a relative position of the information transmission apparatus 100b' with respect to the information transmission apparatus 100b, and (6) forwarding information F including display information regarding the information transmission apparatus 100a' and one item of relative position information indicating a relative position of the information transmission apparatus 100a' with respect to the information transmission apparatus 100b.

Moreover, the information transmission apparatus 100a receives, from the information transmission apparatus 100b', (7) direct-transmission information G including the display information regarding the information transmission apparatus 100b', (8) forwarding information H including the display information regarding the information transmission apparatus 100a and one item of relative position information indicating a relative position of the information transmission apparatus 100a with respect to the information transmission apparatus 100b', (9) forwarding information I including the display information regarding the information transmission apparatus 100b and two items of relative position information indicating a relative position of the information transmission apparatus 100b with respect to the information transmission apparatus 100b', and (10) forwarding information J including the display information regarding the information transmission apparatus 100a' and one item of relative position information indicating a relative position of the information transmission apparatus 100a' with respect to the information transmission apparatus 100b'.

Here, the forwarding information B is generated in the information transmission apparatus 100b on the basis of direct-transmission information K which is received from the information transmission apparatus 100c and includes the display information regarding the information transmission apparatus 100c, and the forwarding information C is generated in the information transmission apparatus 100b on the basis of forwarding information L which is received from the information transmission apparatus 100c and includes the display information regarding the information transmission apparatus 100d and one item of relative position information indicating a relative position of the information transmission apparatus 100d with respect to the information transmission apparatus 100c.

Further, the forwarding information L is generated in the information transmission apparatus 100c on the basis of direct-transmission information M which is received from the information transmission apparatus 100d and includes the display information regarding the information transmission apparatus 100d.

Here, the forwarding information D is generated in the information transmission apparatus 100b on the basis of direct-transmission information N which is received from the information transmission apparatus 100a and includes the display information regarding the information transmission apparatus 100a, and the forwarding information E is generated in the information transmission apparatus 100b on the basis of forwarding information O which is received from the information transmission apparatus 100a or 100a' and includes the display information regarding the information transmission apparatus 100b' and one item of relative position information indicating a relative position of the information transmission apparatus 100b' with respect to the information transmission apparatus 100a.

Further, the forwarding information O is generated in the information transmission apparatus 100a or 100a' on the basis of direct-transmission information P which is received from the information transmission apparatus 100b' and includes the display information regarding the information transmission apparatus 100b'.

Here, the forwarding information F is generated in the information transmission apparatus 100b on the basis of direct-transmission information Q which is received from the information transmission apparatus 100a' and includes the display information regarding the information transmission apparatus 100a'.

Here, the forwarding information H is generated in the information transmission apparatus 100b' on the basis of direct-transmission information R which is received from the information transmission apparatus 100a and includes the display information regarding the information transmission apparatus 100a, and the forwarding information I is generated in the information transmission apparatus 100b' on the basis of forwarding information S which is received from the information transmission apparatus 100a or 100a' and includes the display information regarding the information transmission apparatus 100b and one item of relative position information indicating a relative position of the information transmission apparatus 100b with respect to the information transmission apparatus 100a.

Further, the forwarding information S is generated in the information transmission apparatus 100a or 100a' on the basis of direct-transmission information T which is received from the information transmission apparatus 100b and includes the display information regarding the information transmission apparatus 100b.

Here, the forwarding information J is generated in the information transmission apparatus 100b' on the basis of direct-transmission information U which is received from the information transmission apparatus 100a' and includes the display information regarding the information transmission apparatus 100a'.

Subsequently, the information transmission apparatus 100a detects a relative position H between the information transmission apparatus 100a and the information transmission apparatus 100b and a relative position H' between the information transmission apparatus 100a and the information transmission apparatus 100b', and transmits (1) direct-transmission information V including the display information regarding the information transmission apparatus 100a, (2) forwarding information W which is generated on the basis of the relative position H and the direct-transmission information A and includes the display information regarding the information transmission apparatus 100b and one item of relative position information indicating a relative position of the information transmission apparatus 100b with respect to the information transmission apparatus 100a, (3) forwarding information X which is generated on the basis of the relative position H and the forwarding information B and includes the display information regarding the information transmission apparatus 100c and two items of relative position information indicating a relative position of the information transmission apparatus 100c with respect to the information transmission apparatus 100a, (4) forwarding information Y which is generated on the basis of the relative position H' and the direct-transmission information G and includes the display information regarding the information transmission apparatus 100b' and one item of relative position information indicating a relative position of the information transmission apparatus 100b' with respect to the information transmission apparatus 100a, and (5) forwarding information Z which is generated on the basis of the relative position H and the forwarding information F or the relative position H' and the forwarding information J and includes the display information regarding the information transmission apparatus 100a' and one item of relative position information indicating a relative position of the information transmission apparatus 100a' with respect to the information transmission apparatus 100a.

Here, on the basis of the relative position H and the forwarding information C, the information transmission apparatus 100a can generate forwarding information which includes the display information regarding the information transmission apparatus 100d and three items of relative position information indicating a relative position of the information transmission apparatus 100d with respect to the information transmission apparatus 100a. However, this forwarding information is discarded and is not transmitted, since the upper limit for the alternative transmission via number is set to 2. It should be noted that when the upper limit for the alternative transmission via number is set to 3, this forwarding information is not discarded and is transmitted.

Further, in all the information transmission apparatuses, when a plurality of items of display information regarding information transmission apparatuses having the same apparatus ID, one item of the display information having the smallest alternative transmission via number is left and the other items of the display information are deleted.

Figure 8:
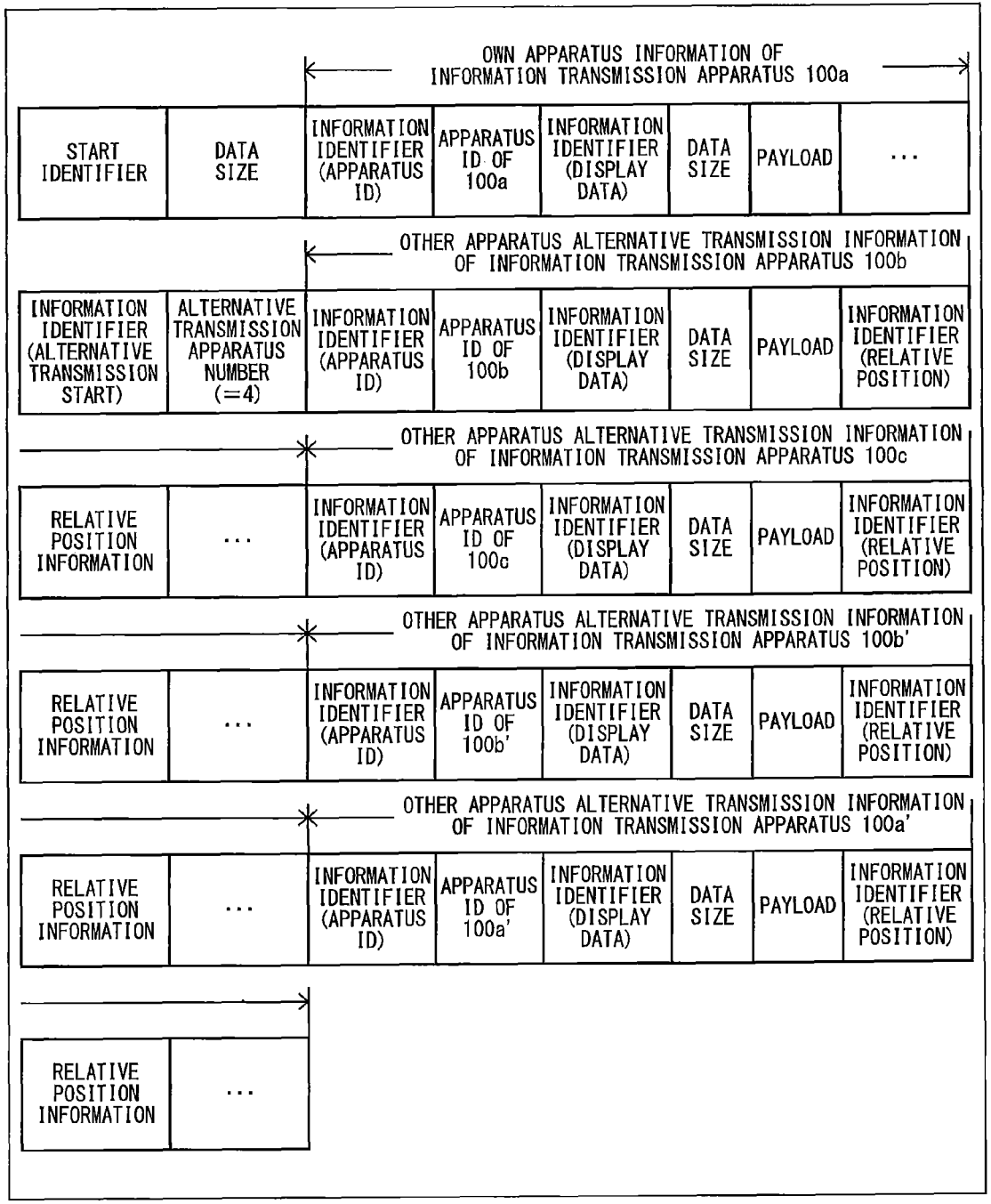

FIG. 8 is a diagram illustrating an example of the contents of transmission information transmitted by the information transmission apparatus 100a. It should be noted that the transmission information of FIG. 8 corresponds to the data 302 of FIG. 4.

As shown in FIG. 8, the transmission information transmitted from the information transmission apparatus 100a starts with a start identifier and a data size, and subsequently includes information regarding the information transmission apparatus 100a. Subsequently, the transmission information includes information regarding the other information transmission apparatuses 100b, 100c, 100b', and 100a' for which alternative transmission is performed. In the example of use shown in (a) to (c) of FIG. 7, the number of apparatuses for which alternative transmission is performed is 4, and thus the value of the alternative transmission apparatus number is 4.

Figure 9:
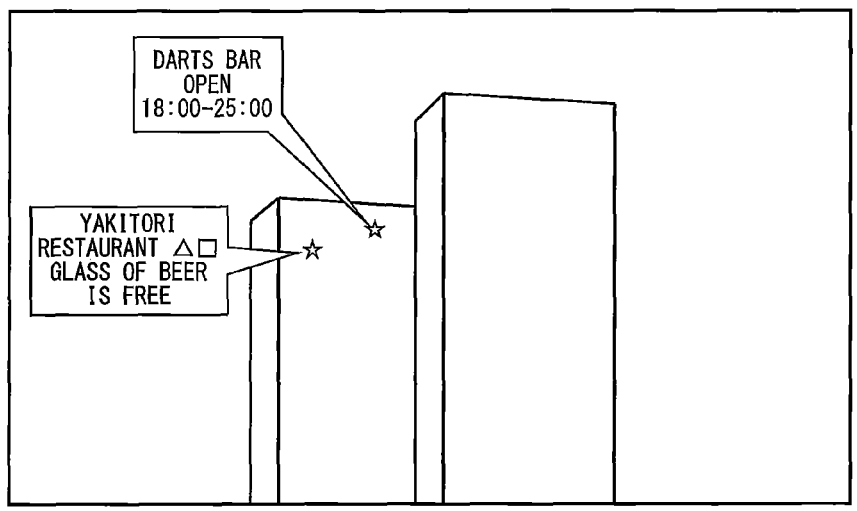
FIG. 9 is a diagram illustrating an example of an image displayed on a display device 240 held by a user 10 in the example of use shown in (a) to (c) of FIG. 7, (a) illustrates the case where alternative transmission is not performed, and (b) illustrates the case where alternative transmission is performed.
Figure 9:
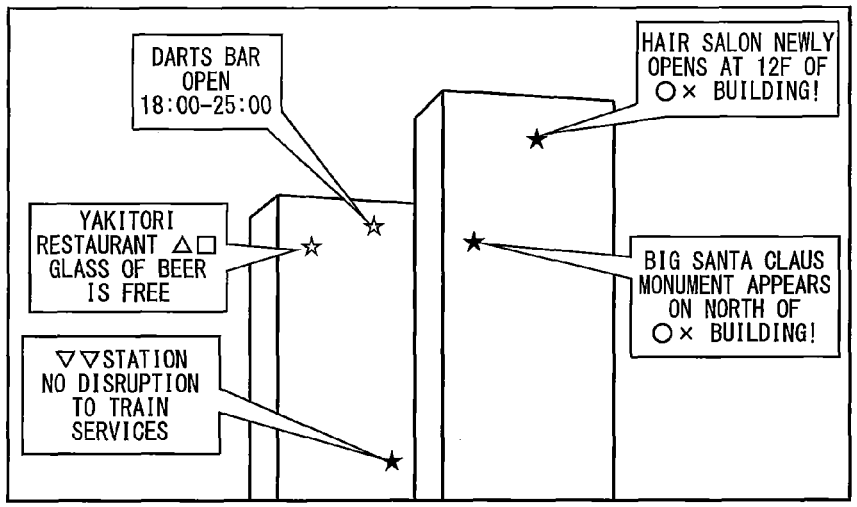

(a) and (b) of FIG. 9 are diagrams illustrating an example of an image displayed on the display device 240 held by the user 10 in the example of use shown in (a) to (c) of FIG. 7.

Here, (a) of FIG. 9 illustrates an example where alternative transmission is not performed and only data obtained by the reception display apparatus 200 directly from the information transmission apparatuses 100a and 100a' is displayed so as to correspond to the positions of transmission sources, which are the respective apparatuses, on an image representing a video image taken by a camera (13 and 14 in the drawing), and the image is similar to an image by a conventional apparatus.

Meanwhile, (b) of FIG. 9 illustrates an example where in addition to data of information transmission apparatuses 100a and 100a' obtained directly by the reception display apparatus 200, data of information transmission apparatuses 100b, 100b', and 100c that cannot be received directly by the reception display apparatus 200 is received through alternative transmission and displayed so as to correspond to the positions of transmission sources that are the respective apparatuses.

<Summary>

According to the optical wireless communication system of the present embodiment, the position and the transmission information of a hidden information transmission apparatus that cannot directly be detected can be received without using another wireless communication medium such as a wireless LAN, and can be used. In addition, a display position is specified on the basis of a relative position, and thus the information transmission apparatus does not have to have a function to measure an absolute position, such as a GPS. In addition, the optical wireless communication system can support stereoscopic position display including a height in a view seen from the user.

It should be noted that all or a part of the function blocks constituting the optical wireless communication transmission apparatus and the optical wireless communication reception apparatus described in the embodiment of the present invention are typically realized as an LSI which is an integrated circuit (the integrated circuit may be referred to as an IC, a system LSI, a super LSI, or an ultra LSI depending on difference in integration degrees). These function blocks may be each made into one chip, or some or all of these function blocks may be made into one chip.

A technique of integrated circuit implementation is not limited to the LSI, but may be achieved by a dedicated circuit or a universal processor. An FPGA (Field Programmable Gate Array) which is programmable after production of an LSI, and a reconfigurable processor in which the connection and the setting of a circuit cell inside the LSI are reconfigurable, may be used.

Further, needless to say, if a technique of integrated circuit implementation, which replaces the LSI, appears as a result of advancement of the semiconductor technique or another technique derived therefrom, function blocks may be integrated by using the technique. Adaptation of a bio technique could be one possibility.

Moreover, each function of the optical wireless communication transmission apparatus and the optical wireless communication reception apparatus described in the embodiment of the present invention may be realized by a CPU interpreting and executing predetermined program data which is stored in a storage device (ROM, RAM, hard disk, and the like) and allows the above-described process procedure to be executed. In this case, the program data may be introduced into the storage device via a storage medium, or may be executed directly on the storage medium. Here, the storage medium refers to a storage medium including a semiconductor memory such as a ROM, a RAM, and a flash memory; a magnetic disk memory such as a flexible disk and a hard disk; an optical disk memory such as a CD-ROM, a DVD, and a BD; and a memory card. Further, the storage medium has a concept including a communication medium such as a telephone line, a transmission path, and the like.

Industrial Applicability

In the optical wireless communication system of the present invention, information regarding and the installed position of a transmission source that cannot be received directly by a reception apparatus are allowed to be transmitted to the reception apparatus through alternative transmission without using communication means other than optical wireless communication, and the information regarding the transmission source is allowed to be displayed so as to be associated with the position of the transmission source on an image representing a video image taken by the camera. Thus, the optical wireless communication system does not have to have a function to detect an absolute position such as a GPS and can be used even in an environment where it is outside the range in which public communication means is available, and hence is industrially very valuable.

Further, in the present embodiment, the example where an information transmission apparatus is installed in a construction such as a building has been described. However, with the same configuration, the embodiment is applicable to, for example, home electrical appliance. For example, a music player having the same functions as those of the information transmission apparatus in the present embodiment is assumed. When transmission information is caused to include information of music files stored in the music player and is transmitted, it is possible to alternatively receive information of the music files from the music player located in such a position that reception is not possible directly therefrom, for example, from a stationary apparatus such as a television and a recorder.

DESCRIPTION OF THE REFERENCE CHARACTERS 1 optical wireless communication system
100a to 100c, 100a' and 100b' information transmission apparatus
110 storage section
120 reception section
121 light-receiving element
122 transmission source detection section
123 communication information demodulation section
130 measurement section
131 distance measurement section
132 azimuth direction measurement section
133 altitude measurement section
140 information processing section
141 transmission information generation section
142 transmission information generation section
150 transmission section
160a to 160c input device
200 reception display apparatus
210 reception section
211 light-receiving element
212 transmission source detection section
213 communication information demodulation section
220 measurement section
221 distance measurement section
222 azimuth direction measurement section
223 altitude measurement section
224 shooting condition detection section
230 information processing section
231 transmission source display position calculation section
232 display information generation section
240 display device

The invention claimed is:

1. A reception display apparatus, comprising:
a processor; and
a non-transitory computer readable storage medium storing executable instructions thereon that, when executed by the processor, cause the reception display apparatus to:
time-sequentially take an image;
receive, from a first information transmission apparatus, (i) direct-transmission information which is transmitted in the form of a signal profile of emitted light and includes first display information regarding the first information transmission apparatus and a first apparatus ID indicating the first information transmission apparatus, and (ii) forwarding information which is transmitted in the form of a signal profile of emitted light and includes one or more items of display information regarding at least a second information transmission apparatus which is not able to communicate with the reception display apparatus using optical wireless communication, one or more apparatus IDs including at least a second apparatus ID indicating the second information transmission apparatus and one or more items of relative position information including at least a second relative position of the second information transmission apparatus with respect to the first information transmission apparatus, the second information transmission apparatus being different from the first information transmission apparatus, and the forwarding information being generated by the first information transmission apparatus using data received from at least the second information transmission apparatus;
measure a first relative position of the first information transmission apparatus with respect to the reception display apparatus;
superimpose the received first display information, such that the first display information is associated with a light-emitting position, corresponding to a position of the first information transmission apparatus, on the taken image;
calculate a coordinate position of the second information transmission apparatus on the taken image, on the basis of the light-emitting position, the received second relative position, and the measured first relative position of the first information transmission apparatus; and
superimpose the received display information regarding the second information transmission apparatus, such that the display information regarding the second information transmission apparatus is associated with the coordinate position, to display the received first display information and at least the received display information regarding the second information transmission apparatus on a display device.

2. The reception display apparatus according to claim 1, wherein
the one or more items of relative position information included in the received forwarding information is represented by a vector,
the measured first relative position of the first information transmission apparatus is represented by a vector, and
the executable instructions, when executed by the processor, further cause the reception display apparatus to:
add the vector representing the one or more items of relative position information included in the received forwarding information and the vector representing the measured first relative position of the first information transmission apparatus; and
calculate, as one vector, the second relative position of the second information transmission apparatus with respect to the reception display apparatus.

3. The reception display apparatus according to claim 1, wherein the executable instructions, when executed by the processor, further cause the reception display apparatus to measure a relative distance and an angle of the first information transmission apparatus with respect to the reception display apparatus.

4. An information transmission apparatus, comprising:
a processor; and
a non-transitory computer readable storage medium storing executable instructions thereon that, when executed by the processor, cause the information transmission apparatus to:
store at least display information regarding the information transmission apparatus;
receive, from a first information transmission apparatus different from the information transmission apparatus, first direct-transmission information which is transmitted in the form of a signal profile of emitted light and includes first display information regarding the first information transmission apparatus and a first apparatus ID indicating the first information transmission apparatus;

measure a relative position of the first information transmission apparatus with respect to a transmission position in the information transmission apparatus;

generate (i) direct-transmission information including the stored display information regarding the information transmission apparatus, and (ii) forwarding information which includes relative position information indicating the measured relative position of the first information transmission apparatus, the received first apparatus ID, and the received first display information included in the first direct-transmission information; and transmit, to a reception display apparatus which is not able to communicate with the first information transmission apparatus using optical wireless communication, the generated direct-transmission information and the generated forwarding information each of the direct-transmission information and the forwarding information being transmitted in the form of a signal profile of emitted light.

5. The information transmission apparatus according to claim 4, wherein
the executable instructions, when executed by the processor, further cause the information transmission apparatus to:
receive, from the first information transmission apparatus, forwarding information which is transmitted in the form of a signal profile of emitted light and includes second display information regarding a second information transmission apparatus different from the first information transmission apparatus and relative position information indicating a first relative position of the second information transmission apparatus with respect to the first information transmission apparatus;
generate relative position information indicating a second relative position of the second information transmission apparatus with respect to the information transmission apparatus, on the basis of the measured relative position and the received first relative position in the received forwarding information from the first information transmission apparatus;
generate hierarchical forwarding information which includes the generated relative position information indicating the second relative position and the second display information regarding the second information transmission apparatus included in the received forwarding information from the first information transmission apparatus; and
transmit the generated hierarchical forwarding information, in the form of a signal profile of emitted light.

6. The information transmission apparatus according to claim 5, wherein
apparatus IDs specific to each of the first information transmission apparatus and the second information transmission apparatus are attached to each of the display information regarding the first information transmission apparatus included in the direct-transmission information and the second display information regarding the second information transmission apparatus included in the forwarding information from the first information transmission apparatus, respectively, and the executable instructions, when executed by the processor, further cause the information transmission apparatus to determine whether or not overlapping apparatus IDs are present among the apparatus IDs attached to the display information included in the direct-transmission information and the forwarding information from the first information transmission apparatus, and to not generate forwarding information including display information to which the overlapping apparatus IDs are attached, when the overlapping apparatus IDs are present.

7. The information transmission apparatus according to claim 5, wherein
an alternative transmission via number indicating via how many information transmission apparatuses each forwarding information is transmitted is attached to each forwarding information, and
the executable instructions, when executed by the processor, further cause the information transmission apparatus to:
update the alternative transmission via number each time generating the hierarchical forwarding information to increase a number of layers; and
discard hierarchical forwarding information to which an alternative transmission via number exceeding a previously permitted predetermined number is attached.

8. The information transmission apparatus according to claim 5, wherein the executable instructions, when executed by the processor, further cause the information transmission apparatus to set an upper limit for a data amount in alternative transmission or set an upper limit for a number of items of forwarding information, and to not generate a portion of forwarding information which exceeds either of the set upper limit for the data amount in alternative transmission or the set upper limit for the number of items of forwarding information.

9. The information transmission apparatus according to claim 5, wherein forwarding information which does not meet a predetermined condition is not generated.

10. An optical wireless communication system comprising:
a first information transmission apparatus of a plurality of information transmission apparatuses, including:
a first processor; and
a first non-transitory computer readable storage medium storing first executable instructions thereon that, when executed by the first processor, cause the first information transmission apparatus to:
store at least first display information regarding the first information transmission apparatus;
receive, from a second information transmission apparatus of the plurality of information transmission apparatuses which is different from the first information transmission apparatus, second direct-transmission information which is transmitted in the form of a signal profile of emitted light and includes second display information regarding the second information transmission apparatus and a second apparatus ID indicating the second information transmission apparatus;
measure a relative position of the second information transmission apparatus with respect to a transmission position in the first information transmission apparatus;
generate (i) direct-transmission information including the stored first display information regarding the first information transmission apparatus and a first apparatus ID indicating the first information transmission apparatus, and (ii) forwarding information which includes relative position information indicating the measured relative position of the second information transmission apparatus, the received second apparatus ID, and the received second display information regarding the second information transmission apparatus included in the second direct-transmission information; and transmit, to a reception display apparatus, the generated direct-transmission information and the generated forwarding information, in the form of a signal profile of emitted light, and the reception display apparatus includes:
a second processor; and
a second non-transitory computer readable storage medium storing second executable instructions thereon that, when executed by the second processor, cause the reception display apparatus to:
time-sequentially take an image;
receive, from the first information transmission apparatus, (i) the direct-transmission information which is transmitted in the form of the signal profile of emitted light and includes the first display information regarding the first information transmission apparatus and the first apparatus ID indicating the first information transmission apparatus, and (ii) the forwarding information which is transmitted in the form of the signal profile of emitted light and includes one or more items of display information regarding at least the second information transmission apparatus which is not able to communicate with the reception display apparatus using optical wireless communication, one or more apparatus IDs including at least the second apparatus ID indicating the second information transmission apparatus and one or more items of the relative position information including at least a second relative position of the second information transmission apparatus with respect to the first information transmission apparatus;
measure a first relative position of the first information transmission apparatus with respect to the reception display apparatus;
superimpose the received first display information, such that the first display information is associated with a light-emitting position, corresponding to a position of the first information transmission apparatus, on the taken image;
calculate a coordinate position of the second information transmission apparatus on the taken image, on the basis of the light-emitting position, the received second relative position, and the measured first relative position of the first information transmission apparatus; and
superimpose the received second display information regarding the second information transmission apparatus, such that the second display information regarding the second information transmission apparatus is associated with the coordinate position, to display the received first display information and at least the received second display information regarding the second information transmission apparatus on a display device.

11. A non-transitory computer readable storage medium having a reception display program stored thereon in a reception display apparatus, wherein the reception display program causes the reception display apparatus to:
time sequentially take an image;
receive, from a first information transmission apparatus, (i) direct-transmission information which is transmitted in the form of a signal profile of emitted light and includes first display information regarding the first information transmission apparatus and a first apparatus ID indicating the first information transmission apparatus, and (ii) forwarding information which is transmitted in the form of a signal profile of emitted light and includes one or more items of display information regarding at least a second information transmission apparatus which is not able to communicate with the reception display apparatus using optical wireless communication, one or more apparatus IDs including at least a second apparatus ID indicating the second information transmission apparatus and one or more items of relative position information including at least a second relative position of the second information transmission apparatus with respect to the first information transmission apparatus, the second information transmission apparatus being different from the first information transmission apparatus, and the forwarding information being generated by the first information transmission apparatus using data received from at least the second information transmission apparatus;
measure a first relative position of the first information transmission apparatus with respect to the reception display apparatus;
superimpose the received first display information, such that the first display information is associated with a light-emitting position, corresponding to a position of the first information transmission apparatus, on the taken image;
calculate a coordinate position of the second information transmission apparatus on the taken image, on the basis of the light-emitting position, the received second relative position, and the measured first relative position of the first information transmission apparatus; and
superimpose the received display information regarding the second information transmission apparatus, such that the display information regarding the second information transmission apparatus is associated with the coordinate position, to display the received first display information and at least the received display information regarding the second information transmission apparatus on a display device.

12. A non-transitory computer readable storage medium having an information transmission program stored thereon in an information transmission apparatus wherein the information transmission apparatus includes:
a storage which stores at least display information regarding the information transmission apparatus, and the information transmission program causes the information transmission apparatus to:
receive, from a first information transmission apparatus different from the information transmission apparatus, first direct-transmission information which is transmitted in the form of a signal profile of emitted light and includes first display information regarding the first information transmission apparatus and a first apparatus ID indicating the first information transmission apparatus;

measure a relative position of the first information transmission apparatus with respect to a transmission position in the information transmission apparatus;

generate (i) direct-transmission information including the stored display information regarding the information transmission apparatus and an apparatus ID indicating the information transmission apparatus, and (ii) forwarding information which includes relative position information indicating the measured relative position of the first information transmission apparatus, the received first apparatus ID, and the received first display information; and transmit, to a reception display apparatus which is not able to communicate with the first information transmission apparatus using optical wireless communication, the generated direct-transmission information and the generated forwarding information, each of the direct-transmission information and the forwarding information being transmitted in the form of a signal profile of emitted light.

13. A reception display integrated circuit, wherein
the reception display integrated circuit integrates all or a part of:

a reception circuit which time-sequentially takes an image, and receives, from a first information transmission apparatus, (i) direct-transmission information which is transmitted in the form of a signal profile of emitted light and includes first display information regarding the first information transmission apparatus and a first apparatus ID indicating the first information transmission apparatus, and (ii) forwarding information which is transmitted in the form of a signal profile of emitted light and includes one or more items of display information regarding at least a second information transmission apparatus which is not able to communicate with the reception display apparatus using optical wireless communication, one or more apparatus IDs including at least a second apparatus ID indicating the second information transmission apparatus and one or more items of relative position information including at least a second relative position of the second information transmission apparatus with respect to the first information transmission apparatus, the second information transmission apparatus being different from the first information transmission apparatus, and the forwarding information being generated by the first transmission apparatus using data received from at least the second information transmission apparatus;

a measurement circuit which measures a first relative position of the first information transmission apparatus with respect to the reception display apparatus;

an information processing circuit which superimposes the first display information regarding the first information transmission apparatus included in the direct-transmission information received by the reception circuit, such that the first display information is associated with a light-emitting position, corresponding to a position of the first information transmission apparatus, on the image taken by the reception circuit, and calculates a coordinate position of the second information transmission apparatus on the image taken by the reception circuit, on the basis of the light-emitting position, the second relative position included in the forwarding information received by the reception circuit, and the first relative position of the first information transmission apparatus measured by the measurement circuit and superimposes the received display information regarding the second information transmission apparatus, such that the display information regarding the second information transmission apparatus is associated with the coordinate position, to display the received first display information and at least the received display information regarding the second information transmission apparatus on a display device.

14. An information transmission integrated circuit, wherein
the information transmission integrated circuit integrates all or a part of:

a storage circuit which stores at least display information regarding the information transmission apparatus;

a reception circuit which receives, from a first information transmission apparatus different from the information transmission apparatus, first direct-transmission information which is transmitted in the form of a signal profile of emitted light and includes first display information regarding the first information transmission apparatus and a first apparatus ID indicating the first information transmission apparatus;

a measurement circuit which measures a relative position of the first information transmission apparatus with respect to a transmission position in the information transmission apparatus;

an information processing circuit which generates (i) direct-transmission information including the display information regarding the information transmission apparatus stored in the storage circuit, and (ii) forwarding information which includes relative position information indicating the relative position of the first information transmission apparatus measured by the measurement circuit, the first apparatus ID, and the first display information regarding the first information transmission apparatus included in the first direct-transmission information received by the reception circuit; and a transmission circuit which transmits, to a reception display apparatus which is not able to communicate with the first information transmission apparatus using optical wireless communication, the direct-transmission information and the forwarding information which are generated by the information processing circuit, each of the direct-transmission information and the forwarding information being transmitted in the form of a signal profile of emitted light.

15. An optical wireless communication method, wherein
a first information transmission apparatus of a plurality of information transmission apparatuses includes:

a storage which stores at least first display information regarding the first information transmission apparatus, the optical wireless communication method comprises:

receiving, in the first information transmission apparatus, from a second information transmission apparatus of the plurality of information transmission apparatuses which is different from the first information transmission apparatus, second direct-transmission information which is transmitted in the form of a signal profile of emitted light and includes second display information regarding the second information transmission apparatus and a second apparatus ID indicating the second information transmission apparatus;

measuring, in the first information transmission apparatus, a relative position of the second information transmission apparatus with respect to a transmission position in the first information transmission apparatus;

generating, in the first information transmission apparatus, (i) direct-transmission information including the stored first display information regarding the first information transmission apparatus and a first apparatus ID indicating the first information transmission apparatus, and (ii) forwarding information which includes relative position information indicating the measured relative position of the second information transmission apparatus, the received second apparatus ID, and the received second display information included in the received second direct-transmission information;

transmitting, in the first information transmission apparatus, the generated direct-transmission information and the generated forwarding information, in the form of a signal profile of emitted light;

time-sequentially taking, in a reception display apparatus, an image;

receiving, from the first information transmission apparatus, the (i) direct-transmission information which is transmitted in the form of the signal profile of emitted light and includes the first display information regarding the first information transmission apparatus and the first apparatus ID indicating the first information transmission apparatus, and (ii) the forwarding information which is transmitted in the form of the signal profile of emitted light and includes one or more items of display information regarding at least the second information transmission apparatus which is not able to communicate with the reception display apparatus using optical wireless communication, one or more apparatus IDs including at least the second apparatus ID indicating the second information transmission apparatus and one or more items of the relative position information including at least the measured relative position of the second information transmission apparatus with respect to the first information transmission apparatus;

measuring, in the reception display apparatus, a first relative position of the first information transmission apparatus with respect to the reception display apparatus; and superimposing, in the reception display apparatus, the received first display information, such that the first display information is associated with a light-emitting position, corresponding to a position of the first information transmission apparatus, on the taken image;

calculating a coordinate position of the second information transmission apparatus on the taken image, on the basis of the light-emitting position, the received second relative position, and the measured first relative position of the first information transmission apparatus; and superimposing the received display information of the second information transmission apparatus, such that the display information regarding the second information transmission apparatus is associated with the coordinate position, to display the received first display information and at least the received display information regarding the second information transmission apparatus on a display device.

* * * * *